United States Patent
Fakoorian et al.

(10) Patent No.: US 11,863,253 B2
(45) Date of Patent: *Jan. 2, 2024

(54) TYPE-1 CODEBOOK CONSTRUCTION WITH MULTIPLE AGGREGATION FACTORS

(71) Applicant: QUALCOMM Incorporated, San Diego, CA (US)

(72) Inventors: Seyed Ali Akbar Fakoorian, San Diego, CA (US); Mostafa Khoshnevisan, San Diego, CA (US); Seyedkianoush Hosseini, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/152,672

(22) Filed: Jan. 10, 2023

(65) Prior Publication Data

US 2023/0239011 A1   Jul. 27, 2023

Related U.S. Application Data

(63) Continuation of application No. 17/222,672, filed on Apr. 5, 2021, now Pat. No. 11,581,922.

(Continued)

(51) Int. Cl.
*H04W 72/12* (2023.01)
*H04B 7/0417* (2017.01)
(Continued)

(52) U.S. Cl.
CPC ......... *H04B 7/0417* (2013.01); *H04B 7/0456* (2013.01); *H04L 1/1896* (2013.01);
(Continued)

(58) Field of Classification Search
CPC .. H04B 7/0417; H04B 7/0456; H04B 7/0478; H04B 7/0623; H04L 1/08; H04L 1/1854;
(Continued)

(56) References Cited

U.S. PATENT DOCUMENTS 11,496,236 B2 * 11/2022 Ye .................. H04W 72/23
2019/0268803 A1    8/2019 He et al.
(Continued)

FOREIGN PATENT DOCUMENTS

EP         3780448 A1   2/2021
WO      2018145074 A1   8/2018
(Continued)

OTHER PUBLICATIONS

International Search Report and Written Opinion—PCT/US2021/026038—ISA/EPO—Jul. 2, 2021.

*Primary Examiner* — Phuc H Tran
(74) *Attorney, Agent, or Firm* — Holland & Hart LLP

(57) ABSTRACT

Methods, systems, and devices for wireless communications are described. A user equipment (UE) may determine that a base station has scheduled the UE for one or more downlink transmissions, each of the one or more downlink transmissions having an associated repetition factor that corresponds to one of a plurality of configured repetition factors configured at the UE. The UE may identify an applied repetition factor to apply to feedback codebook generation for the one or more downlink transmissions. The UE may generate a feedback codebook for reporting feedback for the one or more downlink transmissions, the feedback codebook populated based at least in part on the applied repetition factor and on whether the one or more downlink transmissions were successfully received and decoded. The UE may transmit to the base station a feedback report that includes the feedback codebook.

28 Claims, 18 Drawing Sheets

Related U.S. Application Data

(60) Provisional application No. 63/006,554, filed on Apr. 7, 2020.

(51) Int. Cl.
*H04B 7/0456* (2017.01)
*H04W 72/0446* (2023.01)
*H04W 72/1273* (2023.01)
*H04L 1/1867* (2023.01)
*H04W 72/50* (2023.01)

(52) U.S. Cl.
CPC ... *H04W 72/0446* (2013.01); *H04W 72/1273* (2013.01); *H04W 72/535* (2023.01)

(58) Field of Classification Search
CPC ..... H04L 1/1861; H04L 1/189; H04L 1/1896; H04W 72/0446; H04W 72/1273; H04W 72/535

See application file for complete search history.

(56) References Cited

U.S. PATENT DOCUMENTS

| | | | |
|---|---|---|---|
| 2020/0092068 A1 | 3/2020 | Yang et al. | |
| 2021/0099255 A1* | 4/2021 | Gao | H04L 1/1607 |
| 2021/0314033 A1* | 10/2021 | Fakoorian | H04W 72/535 |
| 2022/0116156 A1* | 4/2022 | Takeda | H04L 1/1861 |
| 2022/0159692 A1* | 5/2022 | Lee | H04L 5/0053 |

FOREIGN PATENT DOCUMENTS

| | | |
|---|---|---|
| WO | 2019184943 A1 | 10/2019 |
| WO | 2019192515 A1 | 10/2019 |
| WO | 2020022523 A1 | 1/2020 |
| WO | 2020033640 A1 | 2/2020 |

* cited by examiner

Codebook

PDSCH Occasion 210

PDSCH#2 220

PDSCH#1 215

PUCCH 225

PDSCH#1 515

PDSCH#2 520

PUCCH 525

500

TYPE-1 CODEBOOK CONSTRUCTION WITH MULTIPLE AGGREGATION FACTORS

CROSS REFERENCE

This application is a continuation of U.S. Non-provisional application Ser. No. 17/222,672 by FAKOORIAN et al., entitled "TYPE-1 CODEBOOK CONSTRUCTION WITH MULTIPLE AGGREGATION FACTORS" filed Apr. 5, 2021, which claims the benefit of U.S. Provisional Patent Application No. 63/006,554 by FAKOORIAN et al., entitled "TYPE-1 CODEBOOK CONSTRUCTION WITH MULTIPLE AGGREGATION FACTORS," filed Apr. 7, 2020, assigned to the assignee hereof, and expressly incorporated by reference herein.

FIELD OF TECHNOLOGY

The following relates generally to wireless communications and more specifically to type-1 codebook construction with multiple aggregation factors.

BACKGROUND

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support type-1 codebook construction with multiple aggregation factors. Generally, the described techniques provide for more efficient and responsive codebook generation for hybrid automatic-repeat/request acknowledgment (HARQ-ACK) reporting. For example, a base station may schedule a user equipment (UE) for downlink transmission(s), with each downlink transmission have an associated repetition factor (e.g., aggregation factor) from a plurality of repetition factors configured at the UE (e.g., one, two, four, eight, etc., aggregation factors). However, the base station and UE may identify an applied repetition factor that will be applied to feedback codebook generation for the downlink transmission(s). Broadly, the applied repetition factor may be irrespective of the associated repetition factor for the configured downlink transmissions (e.g., may be the same or may be different than the aggregation factor configured for the downlink transmission). The base station may transmit the downlink transmission(s) to the UE, which then generates a feedback codebook to report feedback for the downlink transmission(s) to the base station. The UE may use the applied repetition factor in generating the feedback codebook, in addition to whether or not the UE was able to successfully receive and decode one or more repetitions of the downlink transmission. Accordingly, the UE may transmit or otherwise convey a feedback report to the base station that carries or conveys an indication of the feedback codebook.

A method of wireless communication at a UE is described. The method may include determining that a base station has scheduled the UE for one or more downlink transmissions, each of the one or more downlink transmissions having an associated repetition factor that corresponds to one of a set of configured repetition factors configured at the UE, identifying an applied repetition factor to apply to feedback codebook generation for the one or more downlink transmissions, generating a feedback codebook for reporting feedback for the one or more downlink transmissions, the feedback codebook populated based on the applied repetition factor and on whether the one or more downlink transmissions were successfully received and decoded, and transmitting to the base station a feedback report that includes the feedback codebook.

An apparatus for wireless communication at a UE is described. The apparatus may include a processor, memory coupled with the processor, and instructions stored in the memory. The instructions may be executable by the processor to cause the apparatus to determine that a base station has scheduled the UE for one or more downlink transmissions, each of the one or more downlink transmissions having an associated repetition factor that corresponds to one of a set of configured repetition factors configured at the UE, identify an applied repetition factor to apply to feedback codebook generation for the one or more downlink transmissions, generate a feedback codebook for reporting feedback for the one or more downlink transmissions, the feedback codebook populated based on the applied repetition factor and on whether the one or more downlink transmissions were successfully received and decoded, and transmit to the base station a feedback report that includes the feedback codebook.

Another apparatus for wireless communication at a UE is described. The apparatus may include means for determining that a base station has scheduled the UE for one or more downlink transmissions, each of the one or more downlink transmissions having an associated repetition factor that corresponds to one of a set of configured repetition factors configured at the UE, identifying an applied repetition factor to apply to feedback codebook generation for the one or more downlink transmissions, generating a feedback codebook for reporting feedback for the one or more downlink transmissions, the feedback codebook populated based on the applied repetition factor and on whether the one or more downlink transmissions were successfully received and decoded, and transmitting to the base station a feedback report that includes the feedback codebook.

A non-transitory computer-readable medium storing code for wireless communication at a UE is described. The code may include instructions executable by a processor to determine that a base station has scheduled the UE for one or more downlink transmissions, each of the one or more downlink transmissions having an associated repetition factor that corresponds to one of a set of configured repetition factors configured at the UE, identify an applied repetition factor to apply to feedback codebook generation for the one or more downlink transmissions, generate a feedback codebook for reporting feedback for the one or more downlink transmissions, the feedback codebook populated based on the applied repetition factor and on whether the one or more downlink transmissions were successfully received and decoded, and transmit to the base station a feedback report that includes the feedback codebook.

Some examples of the method, apparatuses, and non-transitory computer-readable medium described herein may further include operations, features, means, or instructions for identifying the applied repetition factor based on a maximum number of configured repetition factors from the set of configured repetition factors.

Some examples of the method, apparatuses, and non-transitory computer-readable medium described herein may further include operations, features, means, or instructions for identifying the maximum number of configured repetition factors without counting configured repetition factors corresponding to inactive semi-persistent scheduling (SPS) configurations.

Some examples of the method, apparatuses, and non-transitory computer-readable medium described herein may further include operations, features, means, or instructions for identifying the maximum number of configured repetition factors by counting configured repetition factors corresponding to both active and inactive SPS configurations.

Some examples of the method, apparatuses, and non-transitory computer-readable medium described herein may further include operations, features, means, or instructions for identifying the applied repetition factor as one, and generating the feedback codebook based on a last instance of each downlink transmission that was actually received and decoded.

Some examples of the method, apparatuses, and non-transitory computer-readable medium described herein may further include operations, features, means, or instructions for determining, for each of the one or more downlink transmissions, that one or more instances of the downlink transmission may have been dropped, and generating the feedback codebook differently for the one or more instances of the downlink transmission that may have been dropped and for one or more instances of the downlink transmission that may be not dropped.

In some examples of the method, apparatuses, and non-transitory computer-readable medium described herein, generating the feedback codebook further may include operations, features, means, or instructions for generating an acknowledgement/negative-acknowledgement (ACK/NACK) indication for each downlink transmission that was actually received and decoded, and refraining from generating an ACK/NACK indication for each instance of a dropped downlink transmission opportunity.

In some examples of the method, apparatuses, and non-transitory computer-readable medium described herein, the feedback codebook may be generated without respect to a downlink control information associated with the one or more downlink transmissions.

Some examples of the method, apparatuses, and non-transitory computer-readable medium described herein may further include operations, features, means, or instructions for generating the feedback codebook based on evaluating each of the set of reporting offset values within the evaluation window.

Some examples of the method, apparatuses, and non-transitory computer-readable medium described herein may further include operations, features, means, or instructions for receiving a configuration of a plurality of SPS configurations, wherein each downlink transmission of the one or more downlink transmissions is associated with a common SPS configuration or with different SPS configurations of the plurality of SPS configurations.

In some examples of the method, apparatuses, and non-transitory computer-readable medium described herein, the feedback codebook is a type-1 codebook.

A method of wireless communication at a base station is described. The method may include scheduling a UE for one or more downlink transmissions, each of the one or more downlink transmissions having an associated repetition factor that corresponds to one of a set of configured repetition factors configured at the UE, identifying an applied repetition factor for the UE to apply to feedback codebook generation for the one or more downlink transmissions, and receiving a feedback report from the UE that includes a feedback codebook, the feedback codebook generated for reporting feedback for the one or more downlink transmissions and populated based on the applied repetition factor and on whether the one or more downlink transmissions were successfully received and decoded by the UE.

An apparatus for wireless communication at a base station is described. The apparatus may include a processor, memory coupled with the processor, and instructions stored in the memory. The instructions may be executable by the processor to cause the apparatus to schedule a UE for one or more downlink transmissions, each of the one or more downlink transmissions having an associated repetition factor that corresponds to one of a set of configured repetition factors configured at the UE, identify an applied repetition factor for the UE to apply to feedback codebook generation for the one or more downlink transmissions, and receive a feedback report from the UE that includes a feedback codebook, the feedback codebook generated for reporting feedback for the one or more downlink transmissions and populated based on the applied repetition factor and on whether the one or more downlink transmissions were successfully received and decoded by the UE.

Another apparatus for wireless communication at a base station is described. The apparatus may include means for scheduling a UE for one or more downlink transmissions, each of the one or more downlink transmissions having an associated repetition factor that corresponds to one of a set of configured repetition factors configured at the UE, identifying an applied repetition factor for the UE to apply to feedback codebook generation for the one or more downlink transmissions, and receiving a feedback report from the UE that includes a feedback codebook, the feedback codebook generated for reporting feedback for the one or more downlink transmissions and populated based on the applied repetition factor and on whether the one or more downlink transmissions were successfully received and decoded by the UE.

A non-transitory computer-readable medium storing code for wireless communication at a base station is described. The code may include instructions executable by a processor to schedule a UE for one or more downlink transmissions, each of the one or more downlink transmissions having an associated repetition factor that corresponds to one of a set of configured repetition factors configured at the UE, identify an applied repetition factor for the UE to apply to feedback codebook generation for the one or more downlink transmissions, and receive a feedback report from the UE that includes a feedback codebook, the feedback codebook generated for reporting feedback for the one or more downlink transmissions and populated based on the applied repetition factor and on whether the one or more downlink transmissions were successfully received and decoded by the UE.

Some examples of the method, apparatuses, and non-transitory computer-readable medium described herein may further include operations, features, means, or instructions for identifying the applied repetition factor based on a maximum number of configured repetition factors from the set of configured repetition factors.

Some examples of the method, apparatuses, and non-transitory computer-readable medium described herein may further include operations, features, means, or instructions for identifying the maximum number of configured repetition factors without counting configured repetition factors corresponding to inactive SPS configurations of the UE.

Some examples of the method, apparatuses, and non-transitory computer-readable medium described herein may further include operations, features, means, or instructions for identifying the maximum number of configured repetition factors by counting configured repetition factors corresponding to both active and inactive SPS configurations of the UE.

Some examples of the method, apparatuses, and non-transitory computer-readable medium described herein may further include operations, features, means, or instructions for identifying the applied repetition factor as one, where the feedback codebook may be generated based on a last instance of each downlink transmission that was actually received and decoded.

Some examples of the method, apparatuses, and non-transitory computer-readable medium described herein may further include operations, features, means, or instructions for scheduling, based on the set of configured repetition factors, at least one non-conflicted instance of the downlink transmission during an evaluation window that may be based on a reporting offset value.

Some examples of the method, apparatuses, and non-transitory computer-readable medium described herein may further include operations, features, means, or instructions for determining, for each of the one or more downlink transmissions, that one or more instances of the downlink transmission may have been dropped, where the feedback codebook may be generated differently for the one or more instances of the downlink transmission that may have been dropped and for one or more instances of the downlink transmission that may be not dropped.

In some examples of the method, apparatuses, and non-transitory computer-readable medium described herein, the feedback codebook may be generated based on, an ACK/NACK indication may be generated for each downlink transmission that was actually received and decoded by the UE, and an ACK/NACK indication may be not generated for each instance of a dropped downlink transmission opportunity.

In some examples of the method, apparatuses, and non-transitory computer-readable medium described herein, the feedback codebook may be generated without respect to a downlink control information associated with the one or more downlink transmissions.

In some examples of the method, apparatuses, and non-transitory computer-readable medium described herein, the UE may be configured with a set of reporting offset values for transmitting the feedback report to the base station, each of the set of reporting offset values representing a number of slots after a last nominal downlink transmission, the set of reporting offset values spanning an evaluation window, and the feedback codebook may be generated based on the UE evaluating each of the set of reporting offset values within the evaluation window.

Some examples of the method, apparatuses, and non-transitory computer-readable medium described herein may further include operations, features, means, or instructions for transmitting a configuration of a plurality of SPS configurations, wherein each downlink transmission of the one or more downlink transmissions is associated with a common SPS configuration or with different SPS configurations of the plurality of SPS configurations.

In some examples of the method, apparatuses, and non-transitory computer-readable medium described herein, the feedback codebook is a type-1 codebook.

DETAILED DESCRIPTION

Figure 1:
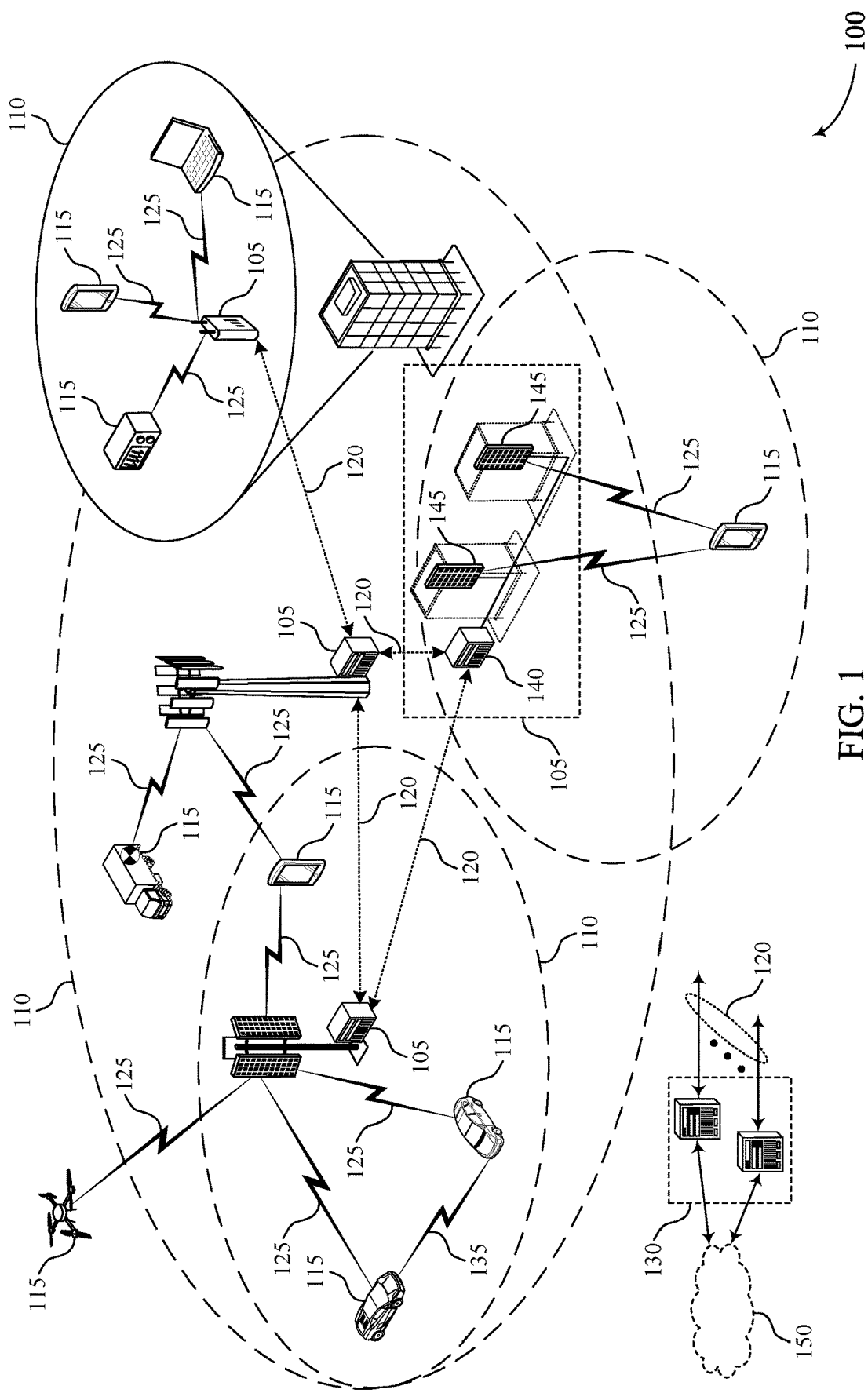
FIG. 1 illustrates an example of a system for wireless communications that supports type-1 codebook construction with multiple aggregation factors in accordance with aspects of the present disclosure.

Wireless communication systems typically utilize hybrid automatic-repeat/request acknowledgment (HARQ-ACK)

feedback reporting to confirm that a device has successfully received and decoded a transmission. The HARQ-ACK feedback report may include a feedback codebook (or simply codebook) that includes a series of bits that are generated based on the configuration of the transmission. For example, a base station may schedule a user equipment (UE) with a downlink transmission (e.g., a physical downlink shared channel (PDSCH) transmission) that includes a repetition factor (or aggregation factor) and associated reporting offset value (e.g., K1 value) for the downlink transmission. The UE may be configured with multiple PDSCH aggregation factors, e.g., for a dynamic PDSCH and/or for different semi-persistent scheduling (SPS) configurations. When the repetition or aggregation factor for a downlink transmission is greater than one, the UE may report a negative-acknowledgment (NACK) bit for each repetition of the downlink transmission until the last repetition. For the last repetition, the UE determines whether at least one repetition was successfully received and decoded and reports that acknowledgment/NACK (ACK/NACK) bit for the downlink transmission. However, some repetitions of the downlink transmission may be conflicted out, and therefore unavailable for transmission to the UE. This may generate confusion and inaccuracies in the codebook that the UE generates provides to the base station, which may lead to wasted resources for unnecessary retransmissions and/or a loss of communications between the UE and base station.

Aspects of the disclosure are initially described in the context of wireless communication systems. Generally, the described techniques provide for more efficient and responsive codebook generation for HARQ-ACK reporting. For example, a base station may schedule a UE for downlink transmission(s), with each downlink transmission having an associated repetition factor (e.g., aggregation factor) from a plurality of repetition factors configured at the UE (e.g., one, two, four, eight, etc., aggregation factors). However, the base station and UE may identify an applied repetition factor that will be applied to feedback codebook generation for the downlink transmission(s). Broadly, the applied repetition factor may be irrespective of the associated repetition factor for the configured downlink transmissions (e.g., may be the same or may be different than the aggregation factor configured for the downlink transmission). The base station may transmit the downlink transmission(s) to the UE, which then generates a feedback codebook to report feedback for the downlink transmission(s) to the base station. The UE may use the applied repetition factor in generating the feedback codebook, in addition to whether or not the UE was able to successfully receive and decode one or more repetitions of the downlink transmission. Accordingly, the UE may transmit or otherwise convey a feedback report to the base station that carries or conveys an indication of the feedback codebook.

Aspects of the disclosure are further illustrated by and described with reference to apparatus diagrams, system diagrams, and flowcharts that relate to type-1 codebook construction with multiple aggregation factors.

FIG. 1 illustrates an example of a wireless communication system 100 that supports type-1 codebook construction with multiple aggregation factors in accordance with aspects of the present disclosure. The wireless communication system 100 may include one or more base stations 105, one or more UEs 115, and a core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communication system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier.

One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MIME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 may determine that a base station 105 has scheduled the UE 115 for one or more downlink transmissions, each of the one or more downlink transmissions having an associated repetition factor that corresponds to one of a plurality of configured repetition factors configured at the UE 115. The UE 115 may identify an applied repetition factor to apply to feedback codebook generation for the one or more downlink transmissions. The UE 115 may generate a feedback codebook for reporting feedback for the one or more downlink transmissions, the feedback codebook populated based at least in part on the applied repetition factor and on whether the one or more downlink transmissions were successfully received and decoded. The UE 115 may transmit to the base station 105 a feedback report that includes the feedback codebook.

A base station 105 may schedule a UE 115 for one or more downlink transmissions, each of the one or more downlink transmissions having an associated repetition factor that corresponds to one of a plurality of configured repetition factors configured at the UE 115. The base station1 105 may identify an applied repetition factor for the UE 115 to apply to feedback codebook generation for the one or more downlink transmissions. The base station 105 may receive a feedback report from the UE 115 that includes a feedback codebook, the feedback codebook generated for reporting feedback for the one or more downlink transmissions and populated based at least in part on the applied repetition factor and on whether the one or more downlink transmissions were successfully received and decoded by the UE 115.

Figure 2:
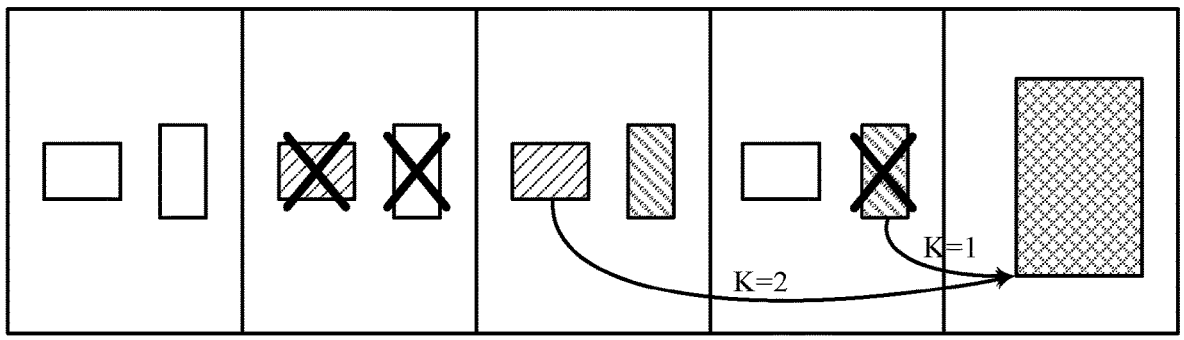
FIG. 2 illustrates an example of a feedback configuration that supports type-1 codebook construction with multiple aggregation factors in accordance with aspects of the present disclosure.
Figure 2:
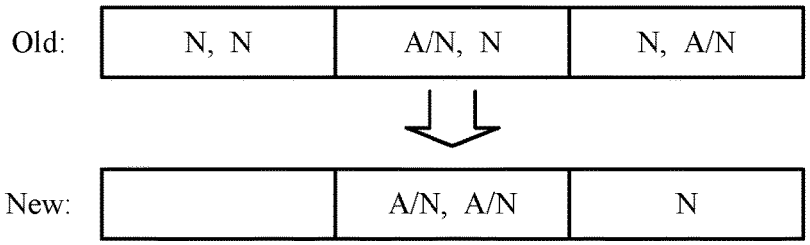
Figure 2:
Figure 2:
Figure 2:
Figure 2:

FIG. 2 illustrates an example of a feedback configuration 200 that supports type-1 codebook construction with multiple aggregation factors in accordance with aspects of the present disclosure. In some examples, feedback configuration 200 may implement aspects of wireless communication system 100. Aspects of feedback configuration 200 may be implemented by a base station and/or UE, which may be examples of the corresponding devices described herein.

Broadly, feedback configuration 200 spans a plurality of slots 205, with five slots 205 being shown by way of example only. Slots 205 may be configured with one or more PDSCH occasions 210, a first downlink transmission 215 (e.g., PDSCH #1), a second downlink transmission 220 (e.g., PDSCH #2), and a physical uplink control channel (PUCCH) 225 (e.g., a feedback reporting occasion where the UE transmits a feedback report to a base station for the downlink transmissions).

In some wireless communication systems, a UE typically reports HARQ-ACK information (e.g., a feedback report) for a PDSCH reception (e.g., downlink transmission) from slot $n-N_{PDSCH}^{repeat}+1$ to slot n in a HARQ-ACK codebook that the UE includes in a PUCCH or physical uplink shared channel (PUSCH) transmission in slot n+k. $N_{PDSCH}^{repeat}$ may be a value of the PDSCH aggregation or repetition factor (pdsch-AggregationFactor) if the UE is provided or otherwise configured with a PDSCH aggregation factor. Otherwise, $N_{PDSCH}^{repeat}$ may be assumed to be one. k may be a number of slots indicated by the PDSCH-to-HARQ feedback timing indicator (e.g., the offset reporting slot indicated by a K or K1 value) in a corresponding downlink control information (DCI) format, or provided by dl-DataToUL-ACK if the PDSCH-to-HARQ feedback timing indicator field is not present in the DCI format. If the UE reports HARQ-ACK information for the PDSCH reception in the slot other than slot n, the UE sets a value for each corresponding HARQ-ACK information bit to NACK or N. If the UE is provided with tdd-UL-DL-ConfigurationCommon or tdd-UL-DL-ConfigurationDedicated and none of the repetitions are received due to an uplink/downlink interaction/conflict, then no ACK/NACK bit is generated in the codebook for the associated PDSCH with $N_{PDSCH}^{repeat}$ repetitions.

In some wireless communication systems, the UE may be configured with multiple SPS configurations. For example, these wireless communication systems may utilize a configuration of a PDSCH aggregation factor (pdsch-AggregationFactor) per downlink SPS configuration, with aggregation factor values ranging from {1,2,4,8} (e.g., aggregation or repetition factors of one, two, four, or eight). For PDSCH scheduled without a corresponding PDCCH transmission (e.g., without DCI) using sps-Config and activated by the DCI format 1_1 or 1_2, or a PDSCH scheduled by the DCI format 1_1 or 1_2 in PDCCH with a cyclic redundancy check (CRC) scrambled with a configured scheduling radio network temporary identifier (CS-RNTI) with a new data indicator (NDI) set to zero, the PDSCH aggregation factor signaled in sps-Config is applied, if configured. Otherwise, the PDSCH aggregation factor signaled in pdsch-Config is applied. For PDSCH scheduled by the DCI format 1_1 or 1_2 in PDCCH with the CRC scrambled with CS-RNTI and the NDI set to one, the PDSCH aggregation factor signaled in pdsch-Config is applied.

Accordingly, the UE may be configured with multiple downlink transmission aggregation factors (e.g., pdsch-AggregationFactor), e.g., for dynamic PDSCH in pdsch-Config and/or for different SPS configurations in sps-Config, and these configurations may have different values of aggregation or repetition factors (e.g., pdsch-AggregationFactor). When multiple aggregation or repetition factors are configured, this raises the question of what should be set for $N_{PDSCH}^{repeat}$ for the purpose of determining when to send a type-1 HARQ-ACK codebook (e.g., in which sub-slot or slot the HARQ-ACK codebook, such as a feedback report, is sent over PUCCH or PUSCH) and/or how to construct the type-1 HARQ-ACK codebook (e.g., that includes the codebook size and ACK/NACK bit location within the codebook).

In such wireless communication systems, a type-1 codebook construction has a size overhead issue when the PDSCH aggregation factor is greater than one and a PDSCH occasion is dropped (e.g., due to a downlink/uplink interaction or conflict). That is, the UE may be configured with only one PDSCH aggregation factor that is set to two (e.g., two repetitions each for the first downlink transmission 215 and the second downlink transmission 220 in the example illustrated in feedback configuration 200). The configured set of K1 values (illustrated as K) may be {1,2,4, 8}. In slot n (e.g., slot 205-d), the second repetition of the second downlink transmission 220 is dropped due to a conflict with an uplink symbol/signal. Additionally, both PDSCH occasions of slot n−2 (e.g., slot 205-b) overlap with uplink symbols or signals, and therefore the first repetition of the first downlink transmission 215 is dropped. The time domain resource allocation (TDRA) table may have only two, non-overlapping start and length indicator value (SLIV) rows for a PDSCH as shown in the "old" codebook (e.g., N,N for slot 205-b, A/N,N for slot 205-c, and N,A/N for slot 205-d). However, the codeword generated using the conventional techniques (e.g., the "old" codebook) includes excessive bits, which increases the size and/or complexity of the codebook. This may also create confusion between the base station and UE with respect to how the codebook is generated, and can therefore be read by the base station. However, aspects of the described techniques enable the dropped PDSCH occasions (e.g., occasions in which a downlink transmission could be or is scheduled for a UE) to be removed from a type-1 codebook.

Accordingly, aspects of the described techniques provide for a base station to schedule a UE for one or more downlink transmissions (e.g., the first downlink transmission 215 and the second downlink transmission 220 by way of example only). Each downlink transmission may have an associated repetition factor (e.g., an aggregation factor that is two for both downlink transmissions in this example) that corresponds to one of a plurality of repetition factors configured at the UE (e.g., {1,2,4,8}). But the base station and UE may identify an applied repetition factor (aggregation factor) to be applied to feedback codebook generation for the scheduled downlink transmissions instead of the associated repetition or aggregation factor.

The base station may transmit the downlink transmissions to the UE according to the configurations. For example, slot n−3 (e.g., slot 205-a) is scheduled with two PDSCH occasions 210. Broadly, PDSCH occasions 210 generally refer to occasions (in the form of resources) in which a downlink transmission can be scheduled for the UE. In feedback configuration 200, the PDSCH occasions 210 shown are resources where a downlink transmission can be scheduled, but are not scheduled. However, each of the downlink transmissions occurs during a PDSCH occasion. In feedback configuration 200, the actually scheduled transmissions are indicated as a PDSCH transmission, while unused transmission resources or occasions are referred to as PDSCH occasions 210. Each of the slots on which PDSCH may be received is illustrated as having the same PDSCH occasions. As discussed, portions of slot n−2 (e.g., slot 205-b) have been configured as uplink portions that overlap with both PDSCH occasions, and therefore any PDSCH occurring within that slot (e.g., whether the PDSCH occasion 210 or a first repetition of the first downlink transmission 215) are dropped. During slot n−1 (e.g., slot 205-c), the base station may transmit the second repetition of the first downlink transmission 215 (having a reporting offset of K or K1=2) and the first repetition of the second downlink transmission 220 (having a reporting offset of K or K1=1). As also discussed, during slot n (e.g., slot 205-d), the second repetition of the second downlink transmission 220 is conflicted out, and therefore not transmitted or dropped.

Accordingly, the UE may generate a feedback codebook for reporting feedback for the scheduled downlink transmissions that is populated based at least in part on the applied repetition factor and on whether the scheduled downlink transmissions were successfully received and decoded by the UE. That is, the UE may utilize the applied repetition factor rather than the repetition factor associated with the downlink transmission(s) configured by the base station. Various alternatives may be utilized with respect to identifying and applying the applied repetition factor.

One alternative may include identifying the applied repetition factor based on a maximum number of configured repetition factors from the configured repetition factors of the UE (e.g., the maximum across all PDSCH aggregation factors, or pdsch-AggregationFactor, configurations). For example, the UE and base station may both identify the maximum number of configured repetition factors without counting or otherwise considering the configured repetition factors corresponding to inactive SPS configuration(s) (e.g., the PDSCH aggregation factors do not include inactive SPS configurations, when configured for the UE). In another example, the base station and UE may identify the maximum number of configured repetition factor by counting the configured repetition factors corresponding to both active and inactive SPS configurations (e.g., the PDSCH aggregation factor, or pdsch-AggregationFactor, configurations that includes both active and inactive SPS configurations, when configured for the UE). In a given slot 205, the ACK/NACK bit position in a type-1 codebook corresponding to a PDSCH from the TDRA table is dropped only if that PDSCH is dropped in that slot 205 and all (e.g., max_pdsch-AggregationFactor)−1 slots 205. The codebook size would have a larger overhead when the PDSCH within a K−1 window is dropped (e.g., as illustrated in the "old" codebook).

One alternative may include identifying the applied repetition factor as one. In this instance, the UE may generate the feedback codebook based on the last instance of each downlink transmission that was actually received and decoded. For example, $N_{PDSCH}^{repeat}$ may always be considered as one and the ACK/NACK bit position for each PDSCH with repetitions may be tied with the last actual PDSCH reception. This may result in the UE generating the "new" codebook illustrated in feedback configuration 200. As can be seen, this approach reduces the size of the codebook that the UE generates and transmits to the base station by half. That is, this reduces the codebook size when some PDSCH occasions are dropped and the PDSCH aggregation factor is greater than one, with even increased benefits when the PDSCH aggregation factor is large.

Accordingly, the UE and base station may determine that instance(s) of the downlink transmissions have been dropped. Accordingly, the UE may generate the feedback codebook differently for the dropped downlink transmissions than for the non-dropped downlink transmissions. For example, the UE may generate an ACK/NACK indication (e.g., ACK/NACK bit) for each downlink transmission that was actually received and decoded, but not generate an ACK/NACK indication breach instance of a dropped downlink transmission opportunity.

In some aspects, the feedback codebook may be generated without respect to a DCI associated with the downlink transmissions (e.g., may be based on SPS configurations). For example, the UE may generate a type-1 feedback codebook based on the SPS configuration provided by the base station.

During slot n+1 (e.g., slot 205-e), the UE may transmit or otherwise convey an indication of a feedback report (e.g., PUCCH 225) to the base station that includes the feedback codebook (e.g., the "new" codebook) generated in accordance with the described techniques. As discussed, these techniques may improve the codebook generation by the UE, reduce the overall size of the codebook to minimize overhead, and more accurately ensure consistency between the codebook the UE generates and the codebook that the base station expects to receive.

Figure 3:
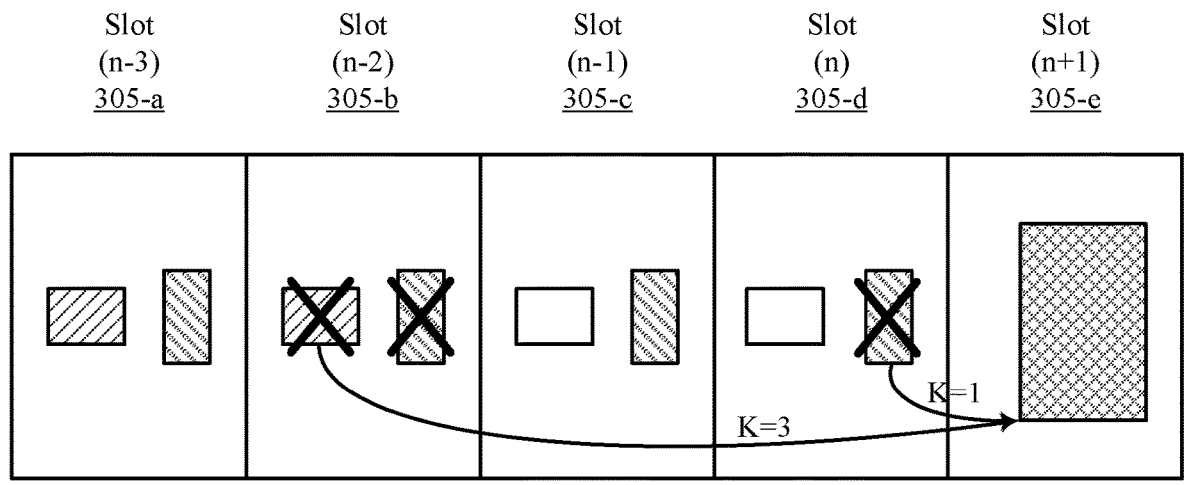
FIG. 3 illustrates an example of a feedback configuration that supports type-1 codebook construction with multiple aggregation factors in accordance with aspects of the present disclosure.

FIG. 3 illustrates an example of a feedback configuration 300 that supports type-1 codebook construction with multiple aggregation factors in accordance with aspects of the present disclosure. In some examples, feedback configuration 300 may implement aspects of wireless communication system 100 and/or feedback configuration 200. Aspects of feedback configuration 300 may be implemented by a base station and/or UE, which may be examples of the corresponding devices described herein.

Broadly, feedback configuration 300 spans a plurality of slots 305, with five slots 305 being shown by way of example only. Slots 305 may be configured with one or more PDSCH occasions 310, a first downlink transmission 315 (e.g., PDSCH #1), a second downlink transmission 320 (e.g., PDSCH #2), and a PUCCH 325 (e.g., a feedback reporting occasion where the UE transmits a feedback report to the base station for the downlink transmissions).

As discussed above, a base station may schedule the UE for one or more downlink transmissions (e.g., the first downlink transmission 315 and the second downlink transmission 320 by way of example only). Each downlink transmission may have an associated repetition factor (e.g., an aggregation factor that is two for the first downlink transmission 315 and four for the second downlink transmission 320 in this example) that corresponds to one of a plurality of repetition factors configured at the UE (e.g., {1,2,4,8}). But the base station and UE may identify an applied repetition factor (aggregation factor) to be applied to feedback codebook generation for the scheduled downlink transmissions instead of the associated repetition or aggregation factor. For example, the applied repetition factor may be one, as discussed in relation to FIG. 2.

The base station may transmit the downlink transmissions 315, 320 to the UE according to the configurations. For example, slot n−3 (e.g., slot 305-a) is scheduled for transmission of a first repetition of both the first downlink transmission 315 and the second downlink transmission 320. Slot n−2 (e.g., slot 305-b) has been configured to include uplink portions that overlap with the scheduled repetitions of both downlink transmissions 315, 320, and therefore any PDSCH(s) occurring within that slot (e.g., both of the second repetitions of the first downlink transmission 315 and second downlink transmission 320) are dropped. During slot n−1 (e.g., slot 305-c), the base station may transmit the third repetition of the second downlink transmission 320, while the PDSCH occasion 310 is unused. During slot n (e.g., slot 305-d), the PDSCH occasion 310 is again unused and the fourth repetition of the second downlink transmission 320 is dropped (e.g., conflicted out due to a designated uplink portion of slot n). The first downlink transmission 315 has a corresponding reporting offset of K or K1=3 and the second downlink transmission 320 has a corresponding reporting offset of K or K1=1.

Accordingly, the UE may generate a feedback codebook for reporting feedback for the scheduled downlink transmissions that is populated based at least in part on the applied repetition factor and on whether the scheduled downlink transmissions were successfully received and decoded by the UE. That is, the UE may utilize the applied repetition factor rather than the repetition factor associated with the downlink transmission(s) configured by the base station.

In the example of FIG. 3, if the applied repetition factor is one, and if the UE is configured with a K1 window of {1, 2, 3}, the ACK/NACK bit for the downlink transmission 315 will not be captured in the feedback codebook. If the applied repletion factor is one, the UE will consider slots n, n−1, and n−2 (corresponding to the K1 window) when populating the feedback codebook. Using the process outlined with respect to FIG. 2, nothing would be included in the codebook corresponding to slot n−2. In slot n−1, a NACK will be included to correspond to unused PDSCH occasion 310, and an ACK/NACK will be included to correspond to the third repetition of downlink transmission 320. In slot n, only a NACK will be included, corresponding to the unused PDSCH occasion 310. As such, while the feedback codebook is still reduced, the codebook lacks any reporting for downlink transmission 315. A scheduling rule may be used to avoid this scenario.

In feedback configuration 300, the scheduling rule may include that the UE may not expect to be configured with a set of K−1 values that, for a given PDSCH with a PDSCH aggregation factor of greater than one, none of the actual PDSCH reception lie within the K1 window. That is, the UE may expect to be configured such that at least one reception of a PDSCH lies within the K1 window. For example, the UE may be configured with the plurality of reporting offset values for transmitting the feedback report to the base station, where each of the reporting offset values represent a number of slots after a last nominal downlink transmission. The reporting offset values may span an evaluation window and the feedback codebook may be generated based on the UE evaluating each of the plurality of reporting offset values within the evaluation window. The UE may generate the feedback codebook based on this technique.

During slot n+1 (e.g., slot 305-e), the UE may transmit or otherwise convey an indication of a feedback report (e.g., PUCCH 325) to the base station that includes the feedback codebook generated in accordance with the described techniques. As discussed, these techniques may improve the codebook generation by the UE, reduce the overall size of the codebook to minimize overhead, and more accurately ensure consistency between the codebook the UE generates and the codebook that the base station expects to receive.

Figure 4:
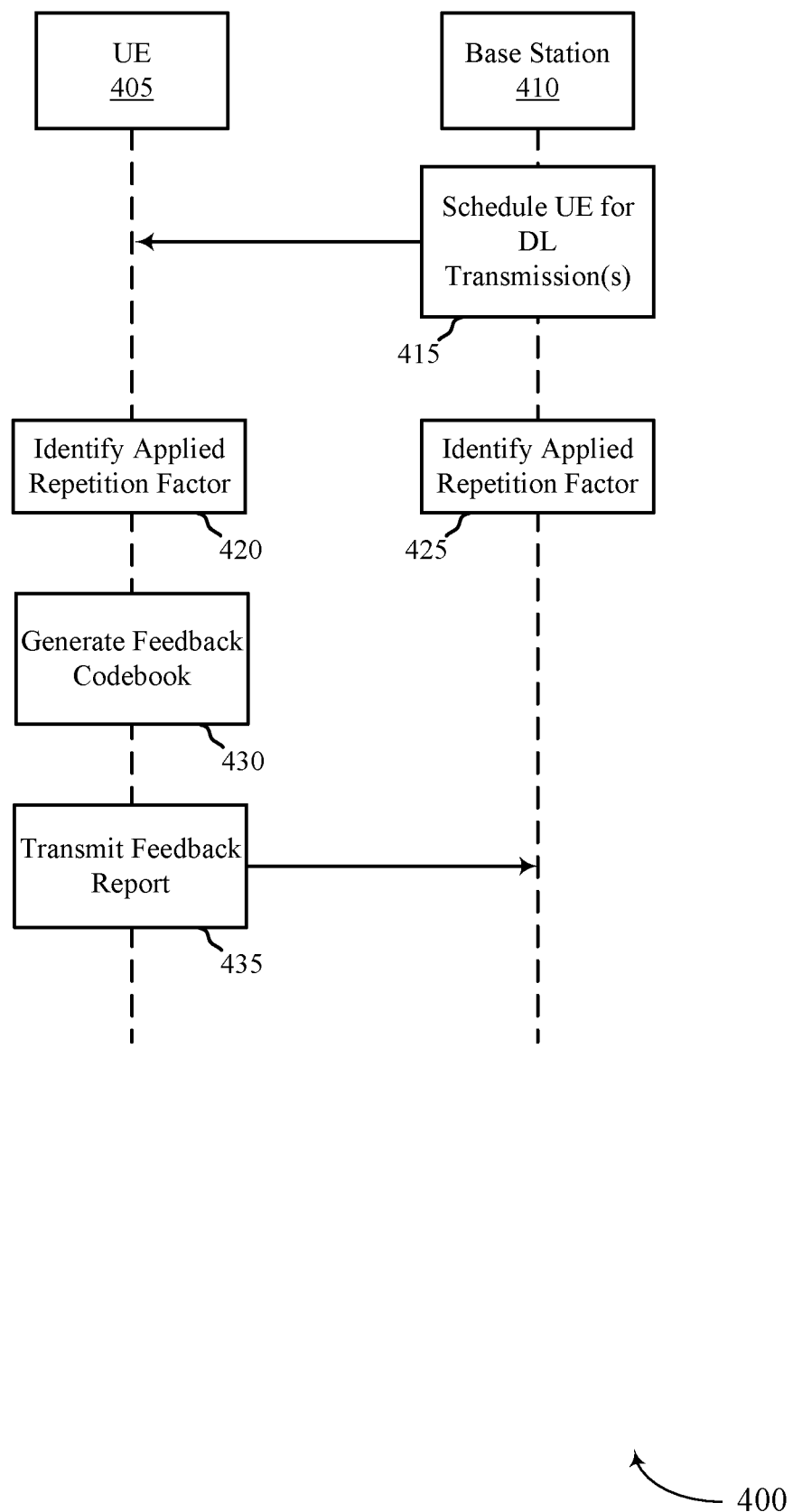
FIG. 4 illustrates an example of a process that supports type-1 codebook construction with multiple aggregation factors in accordance with aspects of the present disclosure.

FIG. 4 illustrates an example of a process 400 that supports type-1 codebook construction with multiple aggregation factors in accordance with aspects of the present disclosure. In some examples, process 400 may implement aspects of wireless communication system 100 and/or feedback configurations 200 and/or 300. Aspects of process 400 may be implemented by UE 405 and/or base station 410, which may be examples of the corresponding devices described herein.

At 415, base station 410 may schedule UE 405 for one or more downlink transmissions (e.g., PDSCH transmissions), with each downlink transmission having an associated repetition factor (e.g., PDSCH aggregation factor) corresponding to one of the plurality of repetition factors configured at UE 405 by base station 410.

At 420, UE 405 may identify an applied repetition factor to apply to feedback codebook generation for the one or more downlink transmissions. Similarly and at 425, the base station may also identify an applied repetition factor for UE 405 to apply to feedback codebook generation for the one or more downlink transmissions. For example, base station 410 may transmit a configuration signal (e.g., in RRC configuration signaling) to UE 405 identifying the applied repetition factor to be utilized for feedback codebook generation. In another example, base station 410 may configure SPS configuration(s) for UE 405, which may implicitly indicate that the applied petition factor is to be used.

Accordingly and at 430, UE 405 may generate a feedback codebook for reporting feedback for the downlink transmissions. The feedback codebook may be populated based on the applied repetition factor and on whether one or more of the downlink transmissions were successfully received and decoded by UE 405. In some aspects, the feedback codebook may be generated without respect to the DCI associated with the downlink transmissions.

For example, UE 405 may identify the applied repetition factor based on a maximum number of configured repetition factors from the plurality of configured repetition factors. For example, UE 405 may identify the maximum number of configured repetition factors without counting inactive SPS configurations. In another example, UE 405 may identify the maximum number of configured repetition factors by counting both active and inactive SPS configurations. In some aspects, this may include UE 405 identifying the applied repetition factor as one. Accordingly, UE 405 may generate feedback codebook based on a last instance of each downlink transmission that was actually successfully received and decoded.

In some aspects, this may include UE 405 determining that one or more instances of the downlink transmissions have been dropped. Accordingly, UE 405 may generate the feedback codebook differently for the dropped downlink transmissions than for the non-dropped (e.g., actually transmitted) downlink transmissions. For example, UE 405 may generate an ACK/NACK indication for each downlink transmission that was actually received and decoded, but refrain from generating an ACK/NACK indication for a dropped downlink transmission.

In some aspects, this may include UE 405 being configured with the plurality of reporting offset values (e.g., K or K-1 values) for transmitting the feedback report to the base station. Each reporting offset value may represent a number of slots after a last nominal downlink transmission, and the reporting offset values may span an evaluation window (e.g., a K1 window). UE 405 may generate the feedback codebook based on an evaluation of each reporting offset value within the evaluation window.

Accordingly and at 435, UE 405 may transmit (and base station 410 may receive) a feedback report that includes the feedback codebook generated in accordance with the described techniques. The feedback report may be transmitted by PUCCH and/or PUSCH.

Figure 5:
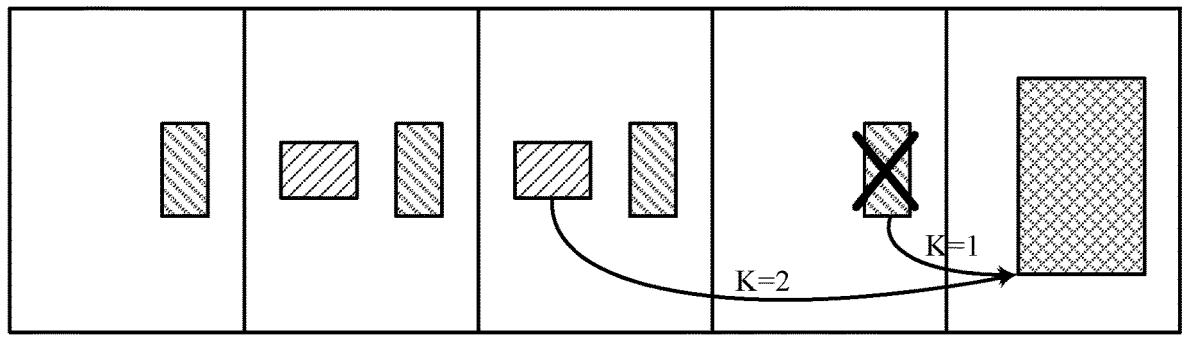
FIG. 5 illustrates an example of a feedback configuration that supports type-1 codebook construction with multiple aggregation factors in accordance with aspects of the present disclosure.
Figure 5:
Figure 5:

FIG. 5 illustrates an example of a feedback configuration 500 that supports type-1 codebook construction with multiple aggregation factors in accordance with aspects of the present disclosure. In some examples, feedback configuration 500 may implement aspects of wireless communication system 100, feedback configuration 200 and/or 300, and/or process 400. Aspects of feedback configuration 500 may be implemented by a base station and/or UE, which may be examples of the corresponding devices described herein.

Broadly, feedback configuration 500 spans a plurality of slots 505, with five slots 505 being shown by way of example only. Slots 505 may be configured with a first downlink transmission 515 (e.g., PDSCH #1), a second downlink transmission 520 (e.g., PDSCH #2), and a PUCCH 525 (e.g., a feedback reporting occasion where the UE transmits a feedback report to a base station for the downlink transmissions).

As discussed above, a base station may schedule the UE for one or more downlink transmissions (e.g., the first downlink transmission 515 and the second downlink transmission 520 by way of example only). Each downlink transmission may have an associated repetition factor (e.g., an aggregation factor that is two for the first downlink transmission 515 and three for the second downlink transmission 520 in this example) that corresponds to one of a plurality of repetition factors configured at the UE (e.g., {1,2,4,8}). But the base station and UE may identify an applied repetition factor (aggregation factor) to be applied to feedback codebook generation for the scheduled downlink transmissions instead of the associated repetition or aggregation factor.

The base station may transmit the downlink transmissions to the UE according to the configurations. For example, slot n-3 (e.g., slot 505-*a*) is scheduled for transmission of a first repetition of the second downlink transmission 520. Slot n-2 (e.g., slot 505-*b*) is scheduled for transmission of a first repetition of the first downlink transmission 515 and second repetition of the second downlink transmission 520. Slot n-1 (e.g., slot 505-*c*) is scheduled for transmission of a second repetition of the first downlink transmission 515 and third repetition of the second downlink transmission 520. During slot n (e.g., slot 505-*d*), the second downlink transmission 520 is dropped (e.g., conflicted out). The first downlink transmission 515 has a corresponding reporting offset of K or K1=2 and the second downlink transmission 520 has a corresponding reporting offset of K or K1=1.

Accordingly, the UE may generate a feedback codebook for reporting feedback for the scheduled downlink transmissions that is populated based at least in part on the applied repetition factor and on whether the scheduled downlink transmissions were successfully received and decoded by the UE. That is, the UE may utilize the applied repetition factor rather than the repetition factor associated with the downlink transmission(s) configured by the base station.

In the example illustrated in feedback configuration 500, regardless of how many PDSCH aggregation factors are configured, the UE may report HARQ-ACK information for a PDSCH with $N_{PDSCH}^{repeat}$=pdsch-AggregationFactor repetitions, from slot $n-N_{PDSCH}^{repeat}+1$ to slot n, when in the HARQ-ACK codebook that the UE includes in a PUCCH or PUSCH transmission in slot n+k, where k is indicted in the DCI. $N_{PDSCH}^{repeat}$ may be defined per PDSCH, e.g., pdsch-AggregationFactor can be two or four, for example, for respectively configured downlink grant and SPS configured downlink transmissions.

Accordingly, during slot n+1 (e.g., slot 505-*e*) the UE may transmit (and base station may receive) a feedback report (e.g., PUCCH 525) that includes the feedback codebook generated in accordance with the described techniques. The feedback report may be transmitted by PUCCH 525 and/or PUSCH.

Figure 6:
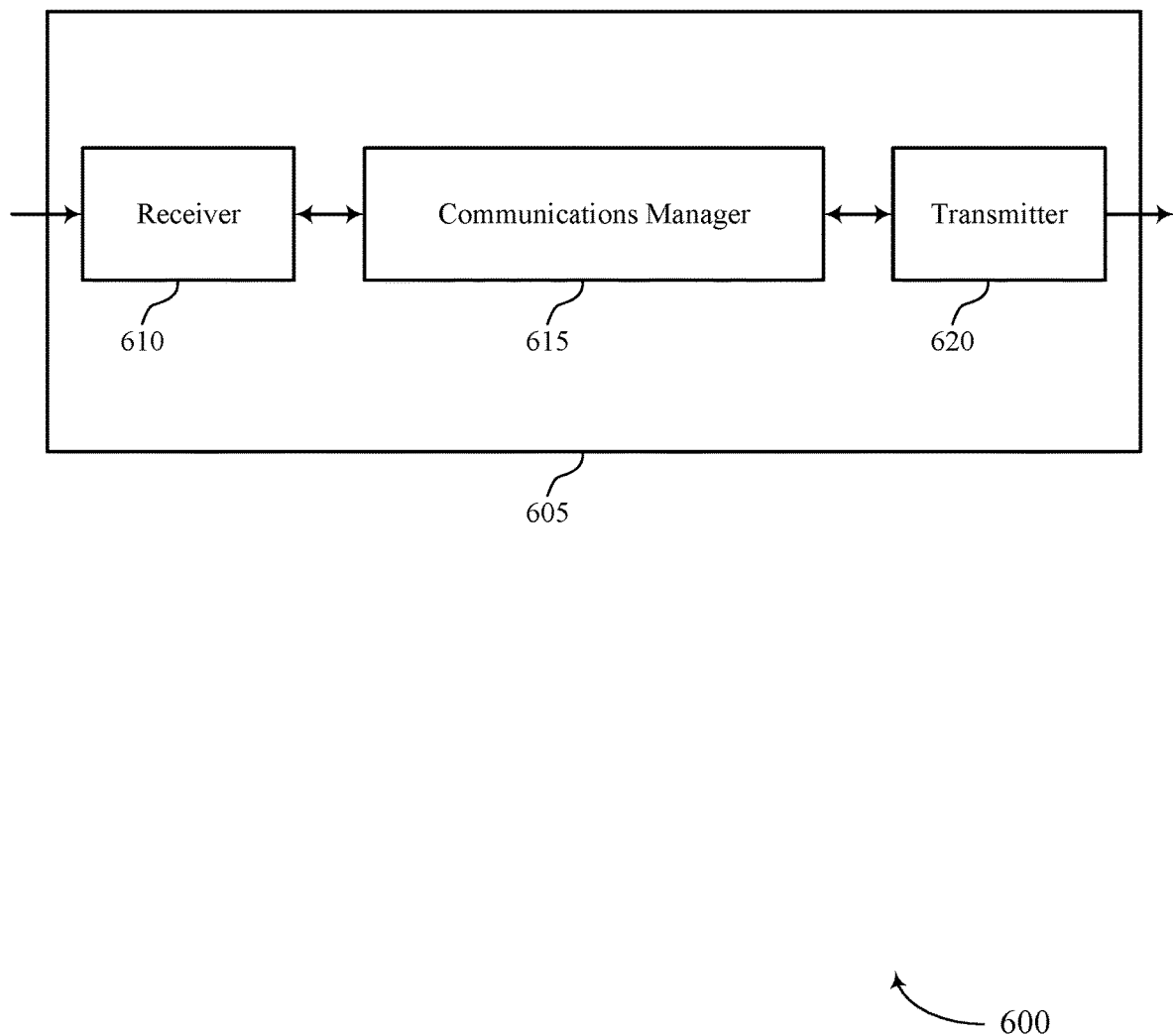
FIGS. 6 and 7 show block diagrams of devices that support type-1 codebook construction with multiple aggregation factors in accordance with aspects of the present disclosure.

FIG. 6 shows a block diagram 600 of a device 605 that supports type-1 codebook construction with multiple aggregation factors in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to type-1 codebook construction with multiple aggregation factors, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may determine that a base station has scheduled the UE for one or more downlink transmissions, each of the one or more downlink transmissions having an associated repetition factor that corresponds to one of a set of configured repetition factors configured at the UE, identify an applied repetition factor to apply to feedback codebook generation for the one or more downlink transmissions, generate a feedback codebook for reporting feedback for the one or more downlink transmissions, the feedback codebook populated based on the applied repetition factor and on whether the one or more downlink transmissions were successfully received and decoded, and transmit to the base station a feedback report that includes the feedback codebook. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
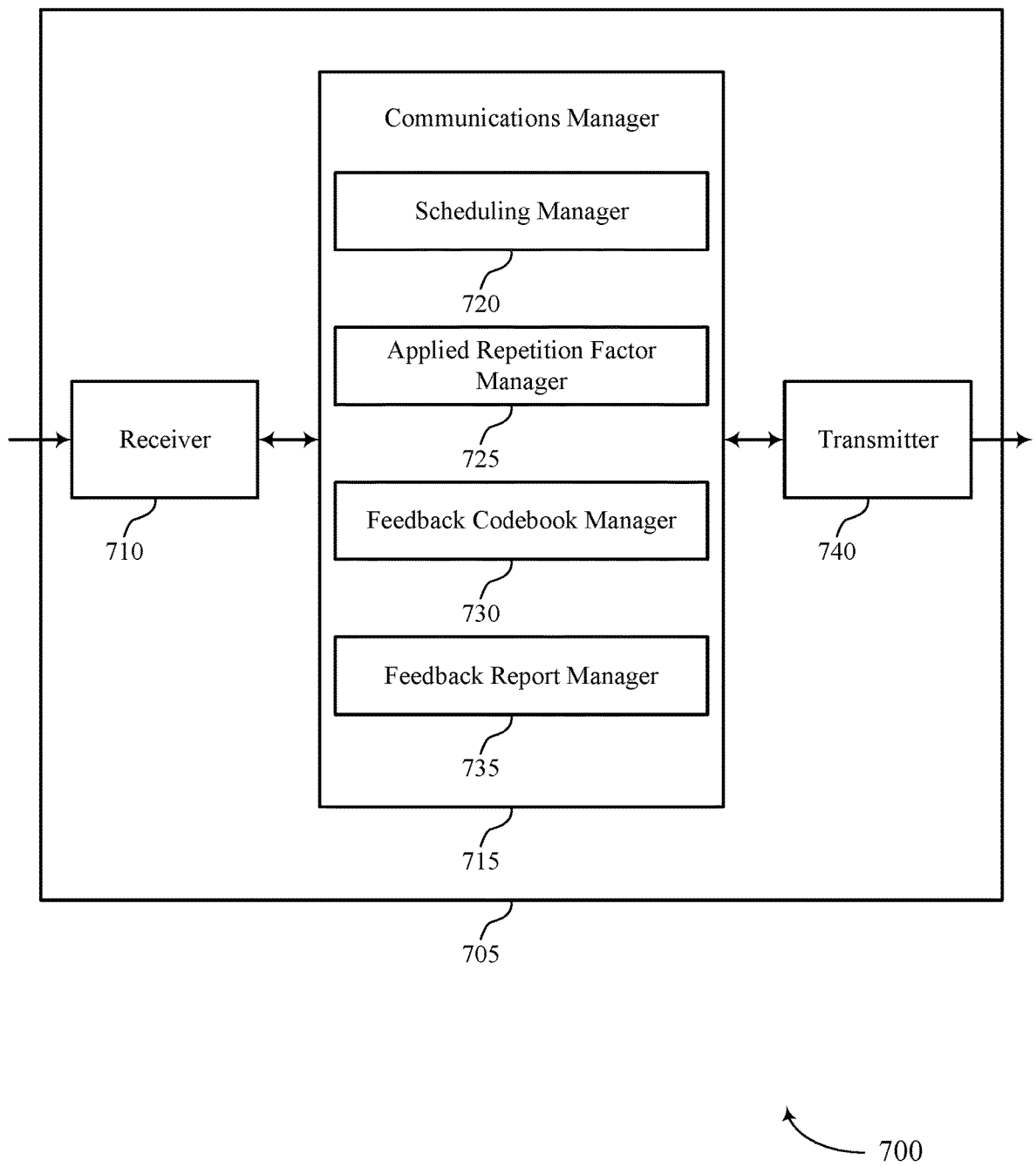

FIG. 7 shows a block diagram 700 of a device 705 that supports type-1 codebook construction with multiple aggregation factors in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to type-1 codebook construction with multiple aggregation factors, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a scheduling manager 720, an applied repetition factor manager 725, a feedback codebook manager 730, and a feedback report manager 735. The communications manager 715 may be an example of aspects of the communications manager 910 described herein.

The scheduling manager 720 may determine that a base station has scheduled the UE for one or more downlink transmissions, each of the one or more downlink transmissions having an associated repetition factor that corresponds to one of a set of configured repetition factors configured at the UE.

The applied repetition factor manager 725 may identify an applied repetition factor to apply to feedback codebook generation for the one or more downlink transmissions.

The feedback codebook manager 730 may generate a feedback codebook for reporting feedback for the one or more downlink transmissions, the feedback codebook populated based on the applied repetition factor and on whether the one or more downlink transmissions were successfully received and decoded.

The feedback report manager 735 may transmit to the base station a feedback report that includes the feedback codebook.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
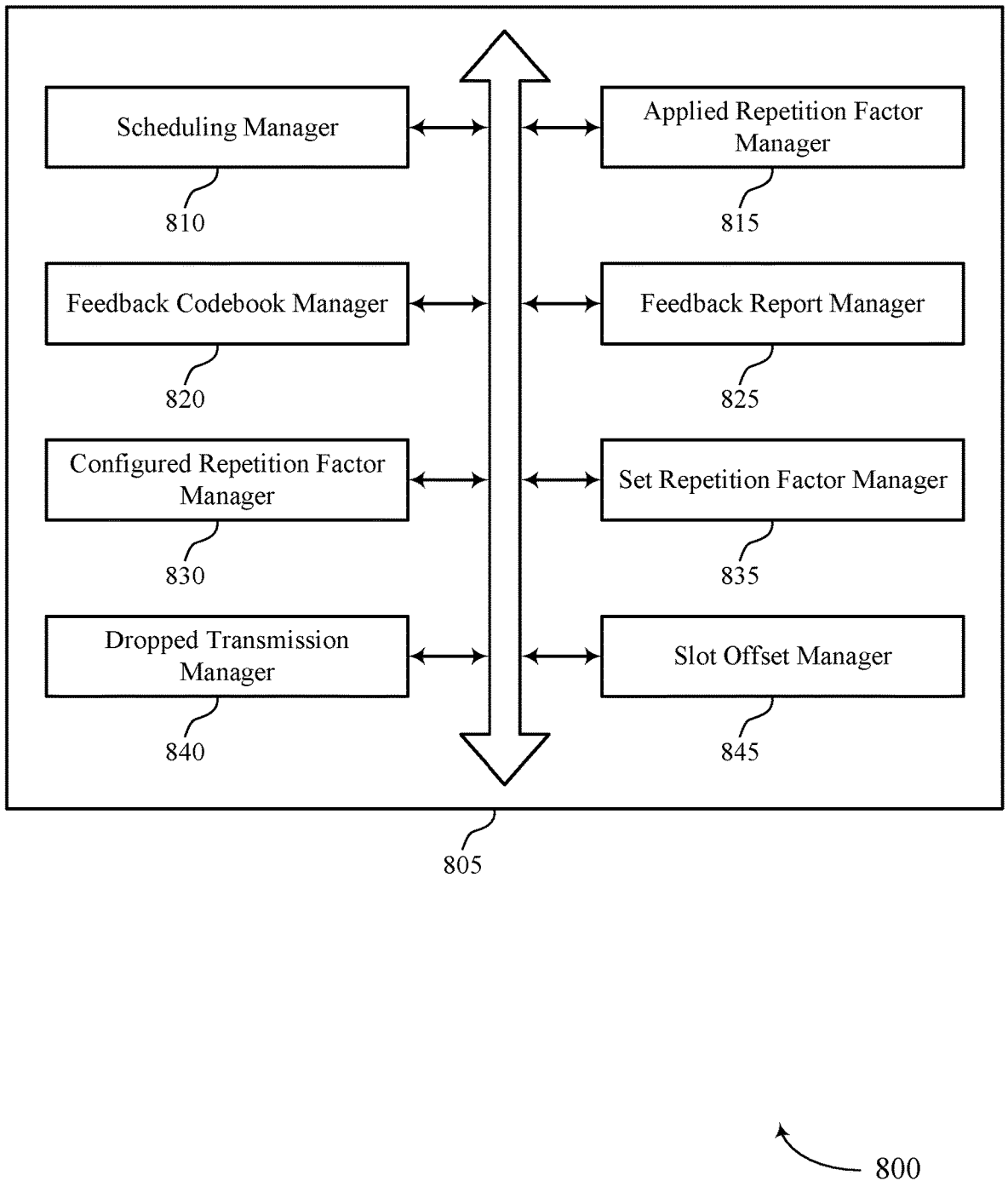
FIG. 8 shows a block diagram of a communications manager that supports type-1 codebook construction with multiple aggregation factors in accordance with aspects of the present disclosure.

FIG. 8 shows a block diagram 800 of a communications manager 805 that supports type-1 codebook construction with multiple aggregation factors in accordance with aspects of the present disclosure. The communications manager 805 may be an example of aspects of a communications manager 615, a communications manager 715, or a communications manager 910 described herein. The communications manager 805 may include a scheduling manager 810, an applied repetition factor manager 815, a feedback codebook manager 820, a feedback report manager 825, a configured repetition factor manager 830, a set repetition factor manager 835, a dropped transmission manager 840, and a slot offset manager 845. Each of these modules may communicate, directly or indirectly, with one another (e.g., via one or more buses).

The scheduling manager 810 may determine that a base station has scheduled the UE for one or more downlink transmissions, each of the one or more downlink transmissions having an associated repetition factor that corresponds to one of a set of configured repetition factors configured at the UE.

The scheduling manager 810 may receive a configuration of a plurality of SPS configurations, wherein each downlink transmission of the one or more downlink transmissions is associated with a common SPS configuration or with different SPS configurations of the plurality of SPS configurations The applied repetition factor manager 815 may identify an applied repetition factor to apply to feedback codebook generation for the one or more downlink transmissions.

The feedback codebook manager 820 may generate a feedback codebook for reporting feedback for the one or more downlink transmissions, the feedback codebook populated based on the applied repetition factor and on whether the one or more downlink transmissions were successfully received and decoded.

In some cases, the feedback codebook is generated without respect to a downlink control information associated with the one or more downlink transmissions.

The feedback report manager 825 may transmit to the base station a feedback report that includes the feedback codebook.

The configured repetition factor manager 830 may identify the applied repetition factor based on a maximum number of configured repetition factors from the set of configured repetition factors. In some examples, the configured repetition factor manager 830 may identify the maximum number of configured repetition factors without counting configured repetition factors corresponding to inactive SPS configurations. In some examples, the configured repetition factor manager 830 may identify the maximum number of configured repetition factors by counting configured repetition factors corresponding to both active and inactive SPS configurations. The set repetition factor manager 835 may identify the applied repetition factor as one. In some examples, the set repetition factor manager 835 may generate the feedback codebook based on a last instance of each downlink transmission that was actually received and decoded.

The dropped transmission manager 840 may determine, for each of the one or more downlink transmissions, that one or more instances of the downlink transmission has been dropped. In some examples, the dropped transmission manager 840 may generate the feedback codebook differently for the one or more instances of the downlink transmission that has been dropped and for one or more instances of the downlink transmission that are not dropped. In some examples, the dropped transmission manager 840 may generate an ACK/NACK indication for each downlink transmission that was actually received and decoded. In some examples, the dropped transmission manager 840 may refrain from generating an ACK/NACK indication for each instance of a dropped downlink transmission opportunity.

The slot offset manager 845 may generate the feedback codebook based on evaluating each of the set of reporting offset values within the evaluation window.

In some cases, the feedback codebook is a type-1 codebook.

Figure 9:
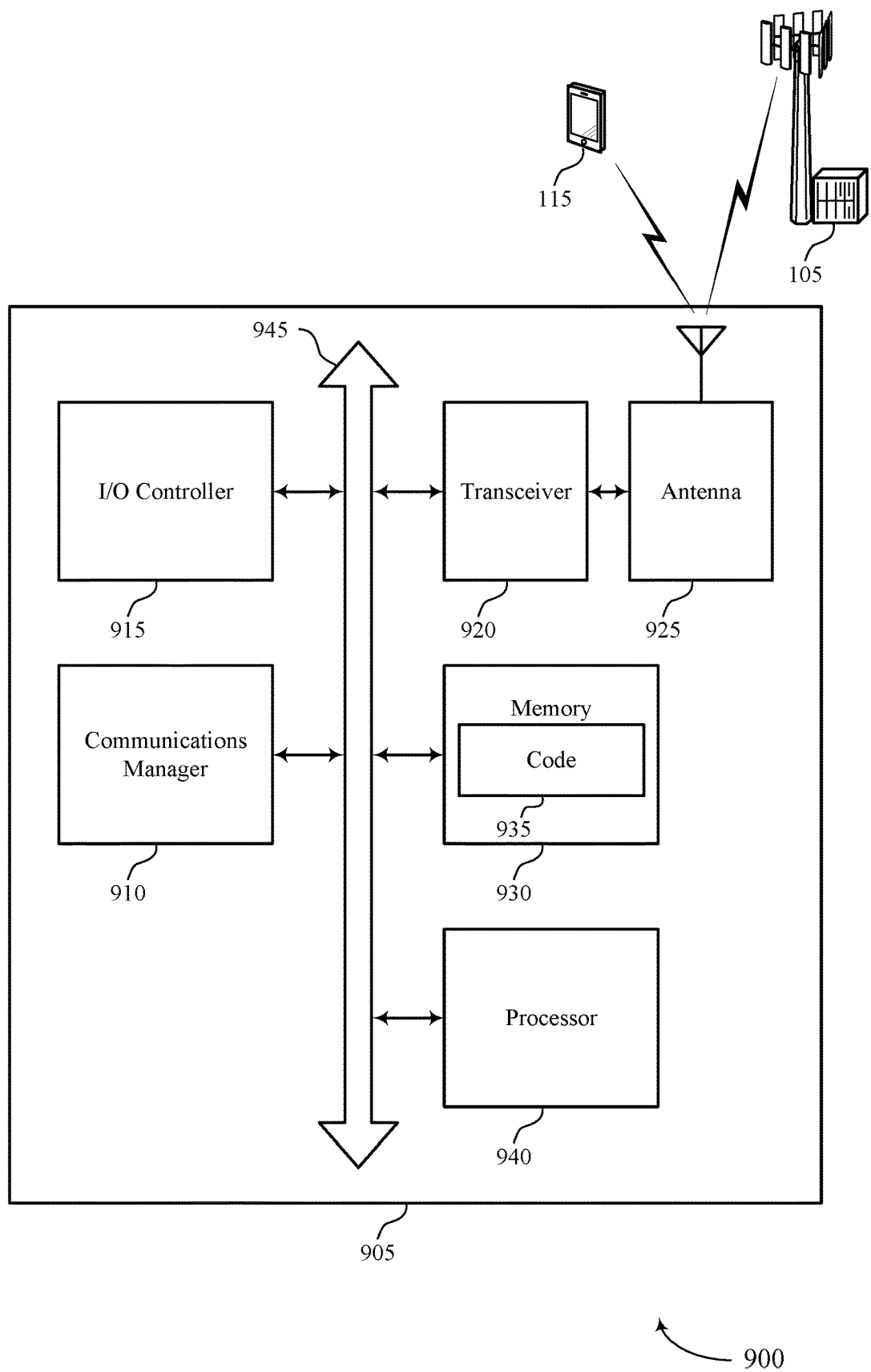
FIG. 9 shows a diagram of a system including a device that supports type-1 codebook construction with multiple aggregation factors in accordance with aspects of the present disclosure.

FIG. 9 shows a diagram of a system 900 including a device 905 that supports type-1 codebook construction with multiple aggregation factors in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may determine that a base station has scheduled the UE for one or more downlink transmissions, each of the one or more downlink transmissions having an associated repetition factor that corresponds to one of a set of configured repetition factors configured at the UE, identify an applied repetition factor to apply to feedback codebook generation for the one or more downlink transmissions, generate a feedback codebook for reporting feedback for the one or more downlink transmissions, the feedback codebook populated based on the applied repetition factor and on whether the one or more downlink transmissions were successfully received and decoded, and transmit to the base station a feedback report that includes the feedback codebook.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random access memory (RAM) and read-only memory (ROM). The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting type-1 codebook construction with multiple aggregation factors).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
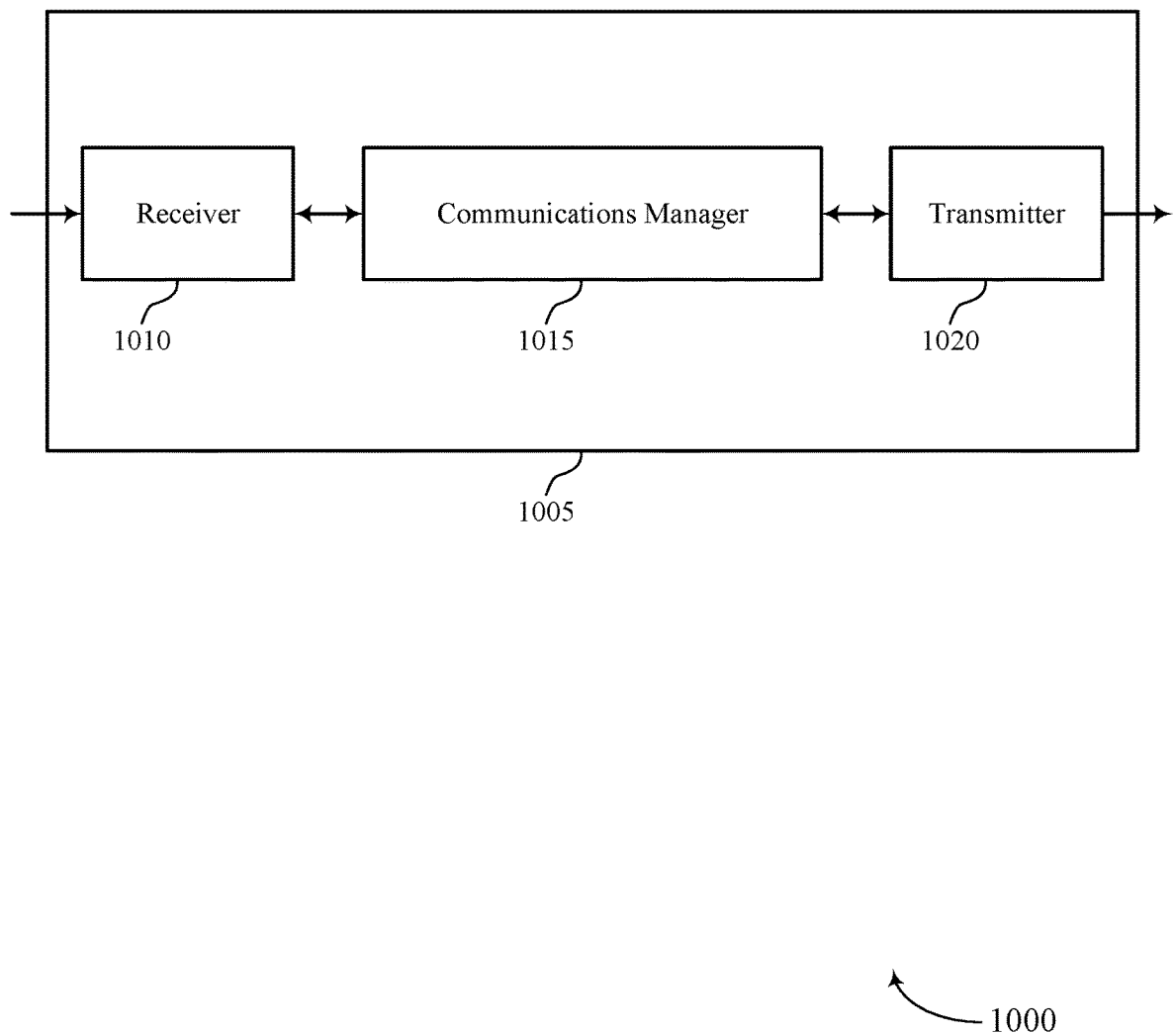
FIGS. 10 and 11 show block diagrams of devices that support type-1 codebook construction with multiple aggregation factors in accordance with aspects of the present disclosure.

FIG. 10 shows a block diagram 1000 of a device 1005 that supports type-1 codebook construction with multiple aggregation factors in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to type-1 codebook construction with multiple aggregation factors, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may schedule a UE for one or more downlink transmissions, each of the one or more downlink transmissions having an associated repetition factor that corresponds to one of a set of configured repetition factors configured at the UE, identify an applied repetition factor for the UE to apply to feedback codebook generation for the one or more downlink transmissions, and receive a feedback report from the UE that includes a feedback codebook, the feedback codebook generated for reporting feedback for the one or more downlink transmissions and populated based on the applied repetition factor and on whether the one or more downlink transmissions were successfully received and decoded by the UE. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
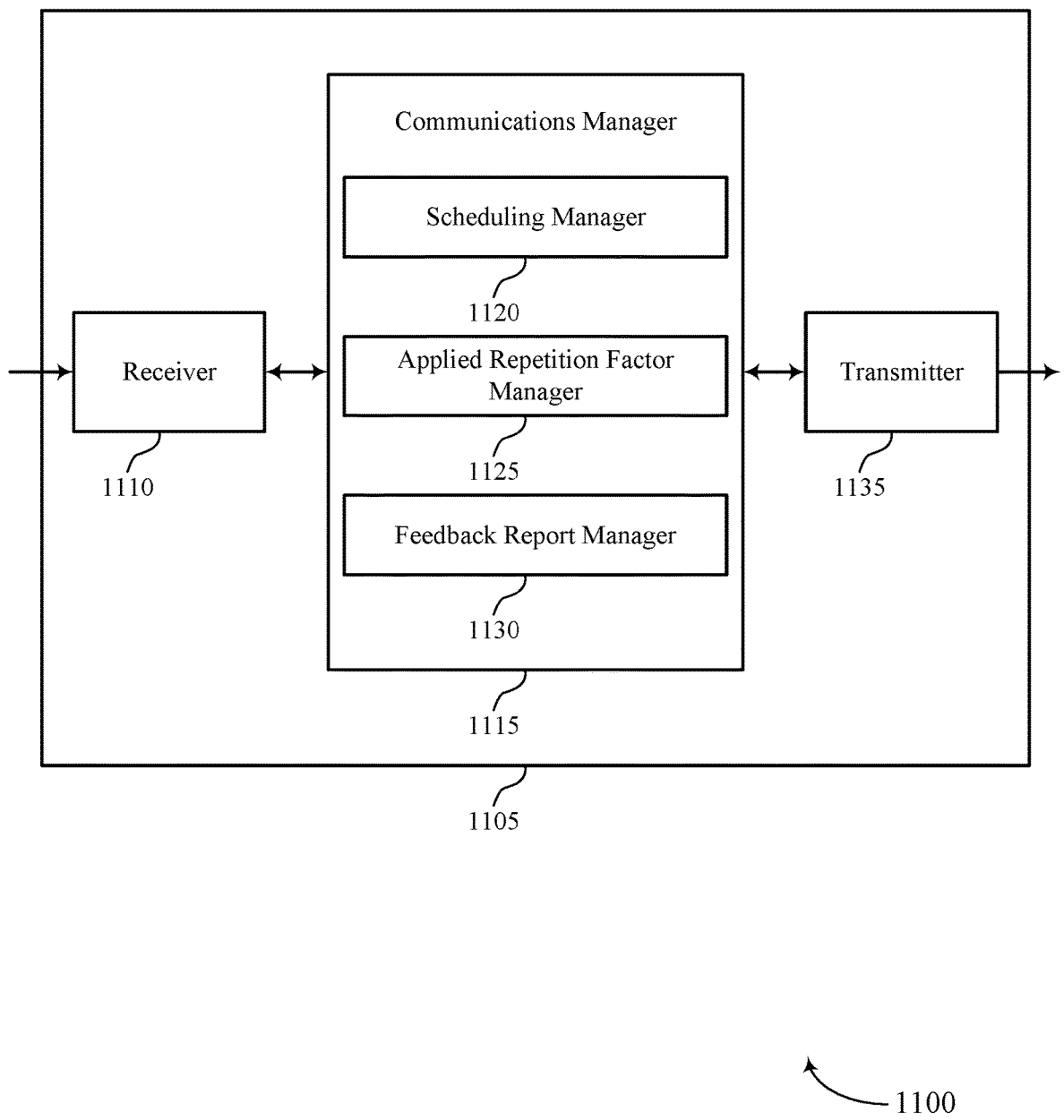

FIG. 11 shows a block diagram 1100 of a device 1105 that supports type-1 codebook construction with multiple aggregation factors in accordance with aspects of the present disclosure. The device 1105 may be an example of aspects of a device 1005, or a base station 105 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to type-1 codebook construction with multiple aggregation factors, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a scheduling manager 1120, an applied repetition factor manager 1125, and a feedback report manager 1130. The communications manager 1115 may be an example of aspects of the communications manager 1310 described herein.

The scheduling manager 1120 may schedule a UE for one or more downlink transmissions, each of the one or more downlink transmissions having an associated repetition factor that corresponds to one of a set of configured repetition factors configured at the UE.

The applied repetition factor manager 1125 may identify an applied repetition factor for the UE to apply to feedback codebook generation for the one or more downlink transmissions.

The feedback report manager 1130 may receive a feedback report from the UE that includes a feedback codebook, the feedback codebook generated for reporting feedback for the one or more downlink transmissions and populated based on the applied repetition factor and on whether the one or more downlink transmissions were successfully received and decoded by the UE.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
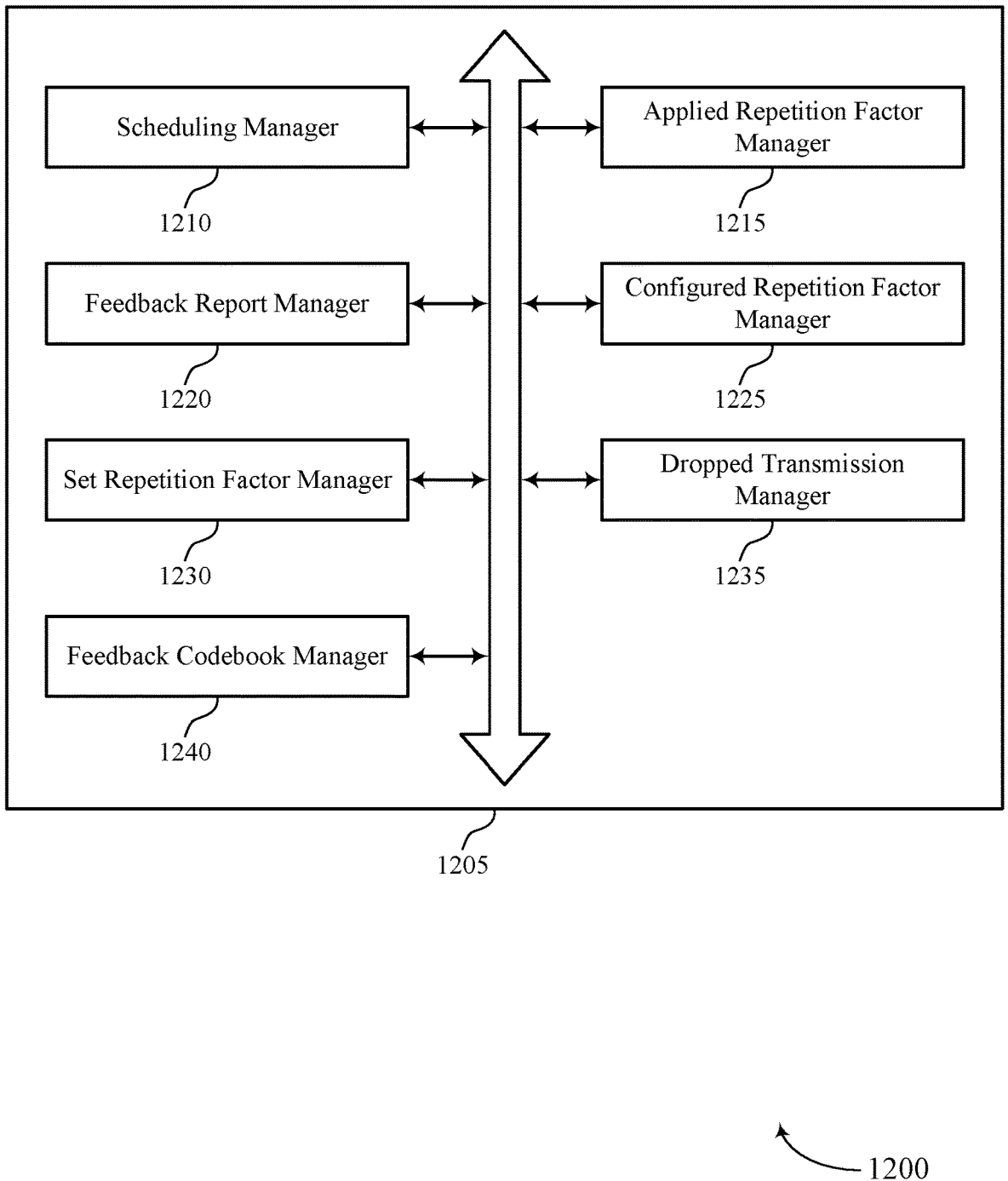
FIG. 12 shows a block diagram of a communications manager that supports type-1 codebook construction with multiple aggregation factors in accordance with aspects of the present disclosure.

FIG. 12 shows a block diagram 1200 of a communications manager 1205 that supports type-1 codebook construction with multiple aggregation factors in accordance with aspects of the present disclosure. The communications manager 1205 may be an example of aspects of a communications manager 1015, a communications manager 1115, or a communications manager 1310 described herein. The communications manager 1205 may include a scheduling manager 1210, an applied repetition factor manager 1215, a feedback report manager 1220, a configured repetition factor manager 1225, a set repetition factor manager 1230, a dropped transmission manager 1235, and a feedback codebook manager 1240. Each of these modules may communicate, directly or indirectly, with one another (e.g., via one or more buses).

The scheduling manager 1210 may schedule a UE for one or more downlink transmissions, each of the one or more downlink transmissions having an associated repetition factor that corresponds to one of a set of configured repetition factors configured at the UE.

The scheduling manager 1210 may transmit a configuration of a plurality of SPS configurations, wherein each downlink transmission of the one or more downlink transmissions is associated with a common SPS configuration or with different SPS configurations of the plurality of SPS configurations.

The applied repetition factor manager 1215 may identify an applied repetition factor for the UE to apply to feedback codebook generation for the one or more downlink transmissions.

The feedback report manager 1220 may receive a feedback report from the UE that includes a feedback codebook, the feedback codebook generated for reporting feedback for the one or more downlink transmissions and populated based on the applied repetition factor and on whether the one or more downlink transmissions were successfully received and decoded by the UE.

The configured repetition factor manager 1225 may identify the applied repetition factor based on a maximum number of configured repetition factors from the set of configured repetition factors. In some examples, the configured repetition factor manager 1225 may identify the maximum number of configured repetition factors without counting configured repetition factors corresponding to inactive SPS configurations of the UE. In some examples, the configured repetition factor manager 1225 may identify the maximum number of configured repetition factors by counting configured repetition factors corresponding to both active and inactive SPS configurations of the UE.

The set repetition factor manager 1230 may identify the applied repetition factor as one, where the feedback codebook is generated based on a last instance of each downlink transmission that was actually received and decoded. In some examples, the set repetition factor manager 1230 may schedule, based on the set of configured repetition factors, at least one non-conflicted instance of the downlink transmission during an evaluation window that is based on a reporting offset value.

The dropped transmission manager 1235 may determine, for each of the one or more downlink transmissions, that one or more instances of the downlink transmission has been dropped, where the feedback codebook is generated differently for the one or more instances of the downlink transmission that has been dropped and for one or more instances of the downlink transmission that are not dropped. In some cases, the feedback codebook is generated based on, an ACK/NACK indication is generated for each downlink transmission that was actually received and decoded by the UE, and an ACK/NACK indication is not generated for each instance of a dropped downlink transmission opportunity.

The feedback codebook manager 1240 may monitor, control, or otherwise manage aspects of the feedback codebook being generated without respect to a downlink control information associated with the one or more downlink transmissions. In some cases, the UE is configured with a set of reporting offset values for transmitting the feedback report to the base station, each of the set of reporting offset values representing a number of slots after a last nominal downlink transmission, the set of reporting offset values spanning an evaluation window, and the feedback codebook is generated based on the UE evaluating each of the set of reporting offset values within the evaluation window.

In some cases, the feedback codebook is a type-1 codebook.

Figure 13:
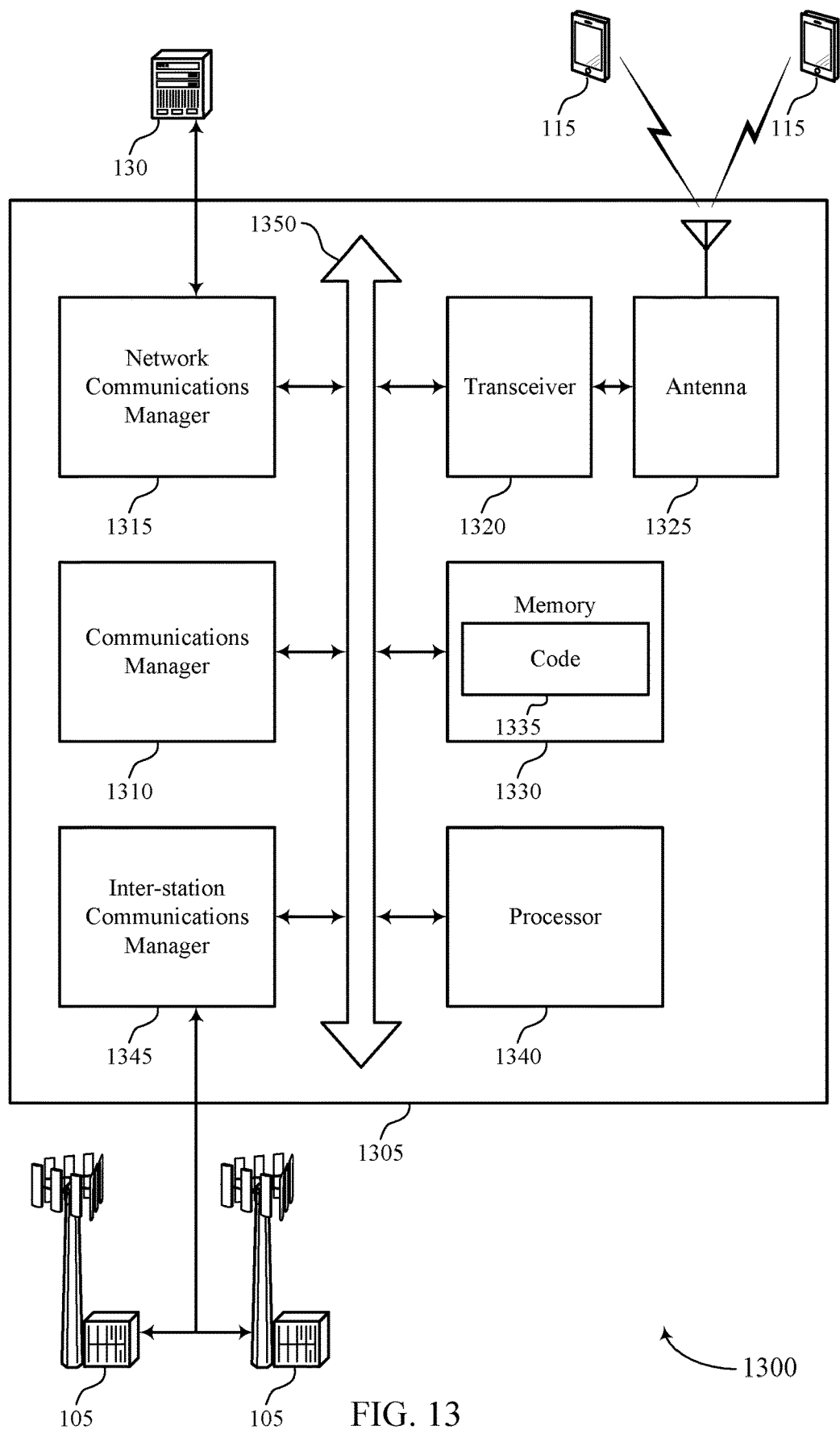
FIG. 13 shows a diagram of a system including a device that supports type-1 codebook construction with multiple aggregation factors in accordance with aspects of the present disclosure.

FIG. 13 shows a diagram of a system 1300 including a device 1305 that supports type-1 codebook construction with multiple aggregation factors in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may schedule a UE for one or more downlink transmissions, each of the one or more downlink transmissions having an associated repetition factor that corresponds to one of a set of configured repetition factors configured at the UE, identify an applied repetition factor for the UE to apply to feedback codebook generation for the one or more downlink transmissions, and receive a feedback report from the UE that includes a feedback codebook, the feedback codebook generated for reporting feedback for the one or more downlink transmissions and populated based on the applied repetition factor and on whether the one or more downlink transmissions were successfully received and decoded by the UE.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a basic input/output system (BIOS) which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting type-1 codebook construction with multiple aggregation factors).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
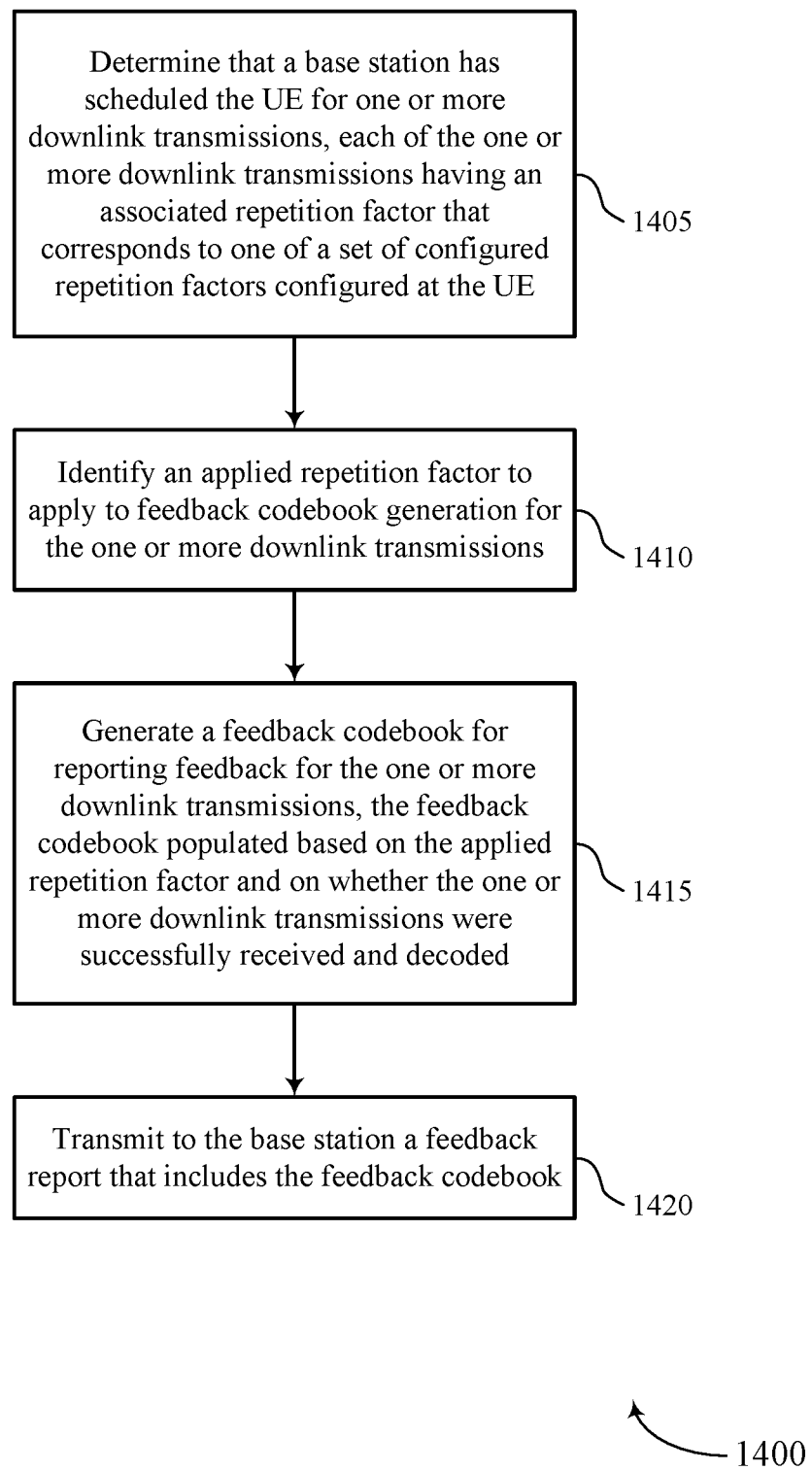
FIGS. 14 through 18 show flowcharts illustrating methods that support type-1 codebook construction with multiple aggregation factors in accordance with aspects of the present disclosure.

FIG. 14 shows a flowchart illustrating a method 1400 that supports type-1 codebook construction with multiple aggregation factors in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may determine that a base station has scheduled the UE for one or more downlink transmissions, each of the one or more downlink transmissions having an associated repetition factor that corresponds to one of a set of configured repetition factors configured at the UE. The operations of 1405 may be performed according to the methods described herein. In some examples, aspects of the operations of 1405 may be performed by a scheduling manager as described with reference to FIGS. 6 through 9.

At 1410, the UE may identify an applied repetition factor to apply to feedback codebook generation for the one or more downlink transmissions. The operations of 1410 may be performed according to the methods described herein. In some examples, aspects of the operations of 1410 may be performed by an applied repetition factor manager as described with reference to FIGS. 6 through 9.

At 1415, the UE may generate a feedback codebook for reporting feedback for the one or more downlink transmissions, the feedback codebook populated based on the applied repetition factor and on whether the one or more downlink transmissions were successfully received and decoded. The operations of 1415 may be performed according to the methods described herein. In some examples, aspects of the operations of 1415 may be performed by a feedback codebook manager as described with reference to FIGS. 6 through 9.

At 1420, the UE may transmit to the base station a feedback report that includes the feedback codebook. The operations of 1420 may be performed according to the methods described herein. In some examples, aspects of the operations of 1420 may be performed by a feedback report manager as described with reference to FIGS. 6 through 9.

Figure 15:
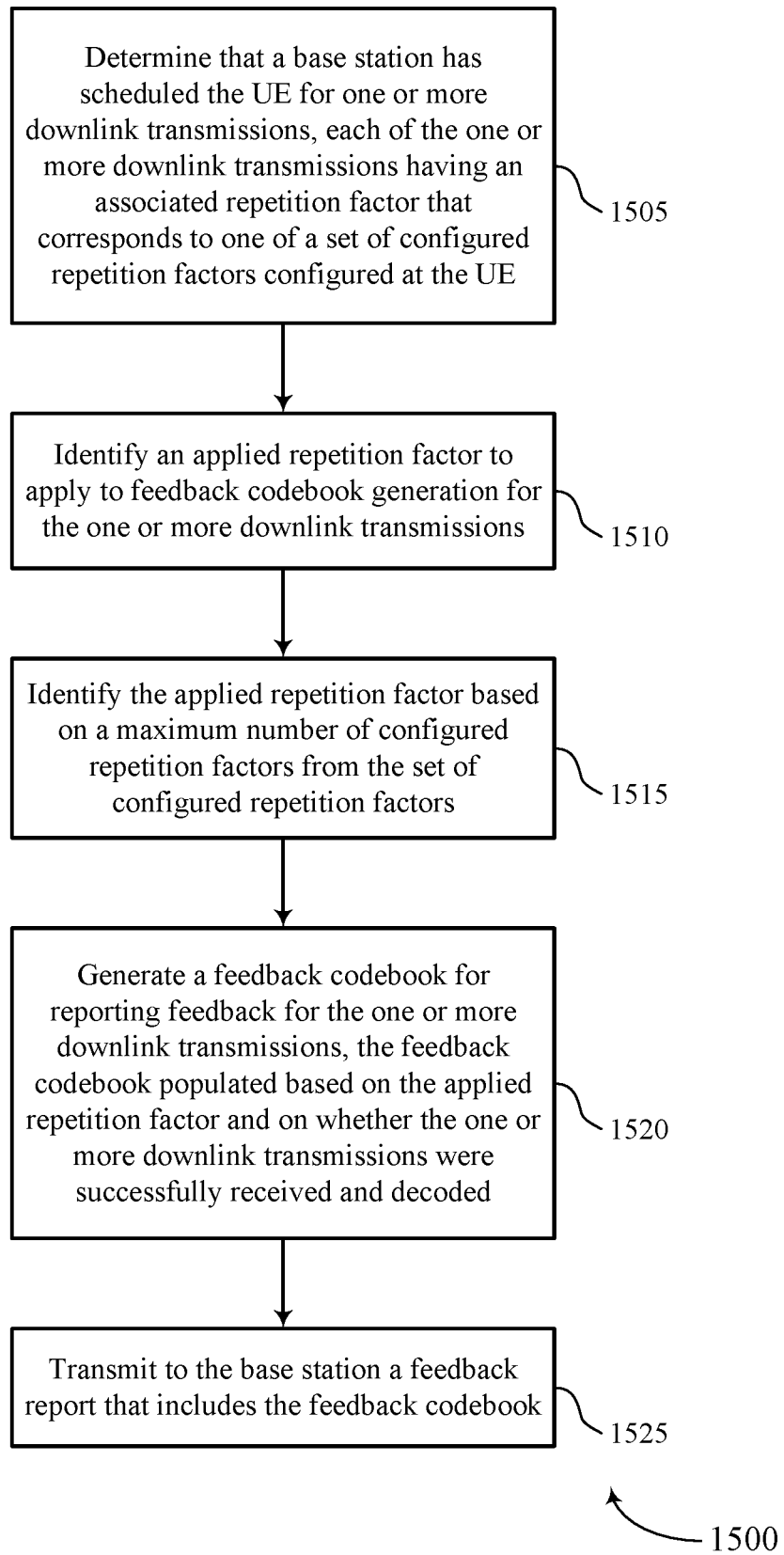

FIG. 15 shows a flowchart illustrating a method 1500 that supports type-1 codebook construction with multiple aggregation factors in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may determine that a base station has scheduled the UE for one or more downlink transmissions, each of the one or more downlink transmissions having an associated repetition factor that corresponds to one of a set of configured repetition factors configured at the UE. The operations of 1505 may be performed according to the methods described herein. In some examples, aspects of the operations of 1505 may be performed by a scheduling manager as described with reference to FIGS. 6 through 9.

At 1510, the UE may identify an applied repetition factor to apply to feedback codebook generation for the one or more downlink transmissions. The operations of 1510 may be performed according to the methods described herein. In some examples, aspects of the operations of 1510 may be performed by an applied repetition factor manager as described with reference to FIGS. 6 through 9.

At 1515, the UE may identify the applied repetition factor based on a maximum number of configured repetition factors from the set of configured repetition factors. The operations of 1515 may be performed according to the methods described herein. In some examples, aspects of the operations of 1515 may be performed by a configured repetition factor manager as described with reference to FIGS. 6 through 9.

At 1520, the UE may generate a feedback codebook for reporting feedback for the one or more downlink transmissions, the feedback codebook populated based on the applied repetition factor and on whether the one or more downlink transmissions were successfully received and decoded. The operations of 1520 may be performed according to the methods described herein. In some examples, aspects of the operations of 1520 may be performed by a feedback codebook manager as described with reference to FIGS. 6 through 9.

At 1525, the UE may transmit to the base station a feedback report that includes the feedback codebook. The operations of 1525 may be performed according to the methods described herein. In some examples, aspects of the operations of 1525 may be performed by a feedback report manager as described with reference to FIGS. 6 through 9.

Figure 16:
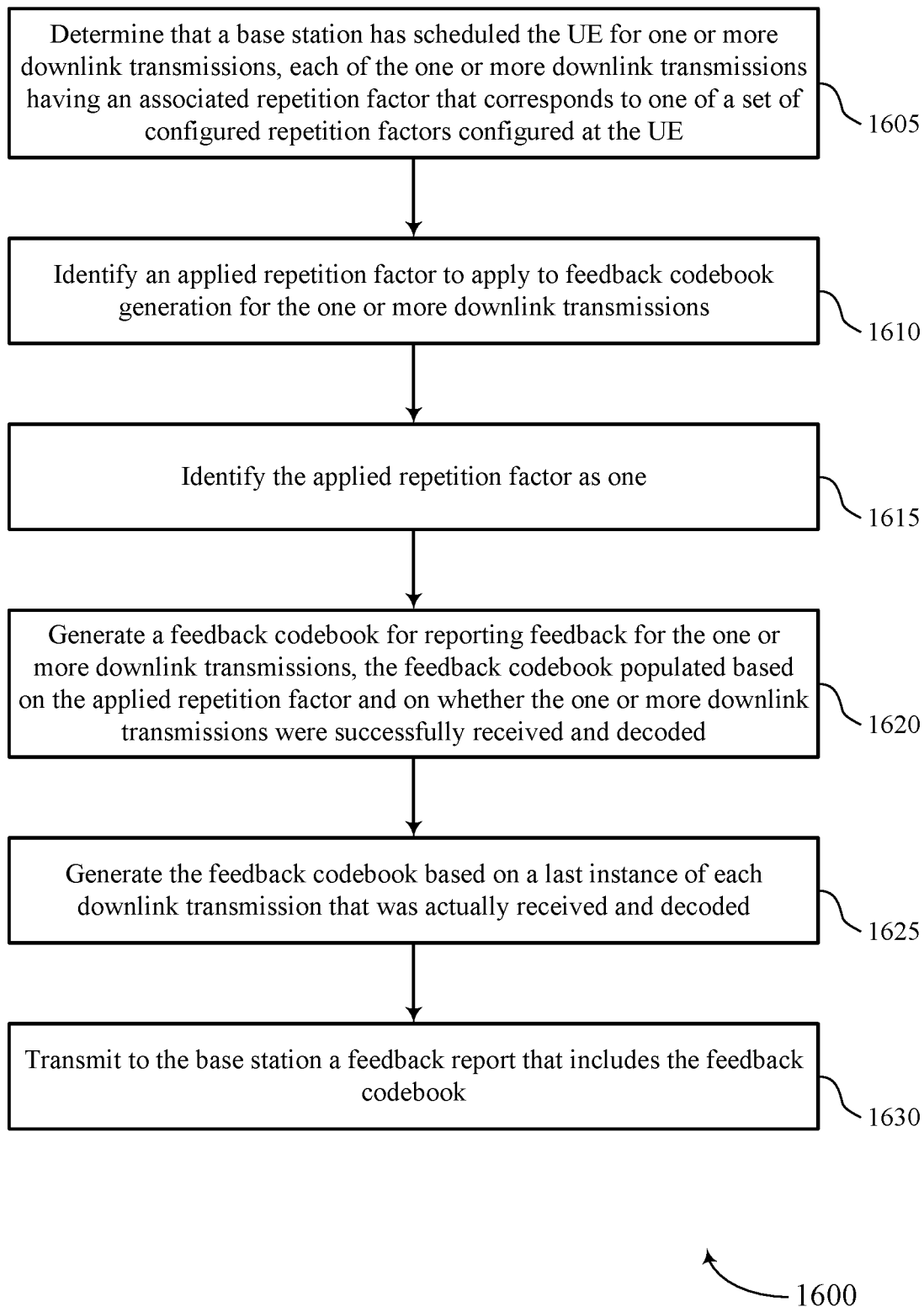

FIG. 16 shows a flowchart illustrating a method 1600 that supports type-1 codebook construction with multiple aggregation factors in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may determine that a base station has scheduled the UE for one or more downlink transmissions, each of the one or more downlink transmissions having an associated repetition factor that corresponds to one of a set of configured repetition factors configured at the UE. The operations of 1605 may be performed according to the methods described herein. In some examples, aspects of the operations of 1605 may be performed by a scheduling manager as described with reference to FIGS. 6 through 9.

At 1610, the UE may identify an applied repetition factor to apply to feedback codebook generation for the one or more downlink transmissions. The operations of 1610 may be performed according to the methods described herein. In some examples, aspects of the operations of 1610 may be performed by an applied repetition factor manager as described with reference to FIGS. 6 through 9.

At 1615, the UE may identify the applied repetition factor as one. The operations of 1615 may be performed according to the methods described herein. In some examples, aspects of the operations of 1615 may be performed by a set repetition factor manager as described with reference to FIGS. 6 through 9.

At 1620, the UE may generate a feedback codebook for reporting feedback for the one or more downlink transmissions, the feedback codebook populated based on the applied repetition factor and on whether the one or more downlink transmissions were successfully received and decoded. The operations of 1620 may be performed according to the methods described herein. In some examples, aspects of the operations of 1620 may be performed by a feedback codebook manager as described with reference to FIGS. 6 through 9.

At 1625, the UE may generate the feedback codebook based on a last instance of each downlink transmission that was actually received and decoded. The operations of 1625 may be performed according to the methods described herein. In some examples, aspects of the operations of 1625 may be performed by a set repetition factor manager as described with reference to FIGS. 6 through 9.

At 1630, the UE may transmit to the base station a feedback report that includes the feedback codebook. The operations of 1630 may be performed according to the methods described herein. In some examples, aspects of the operations of 1630 may be performed by a feedback report manager as described with reference to FIGS. 6 through 9.

Figure 17:
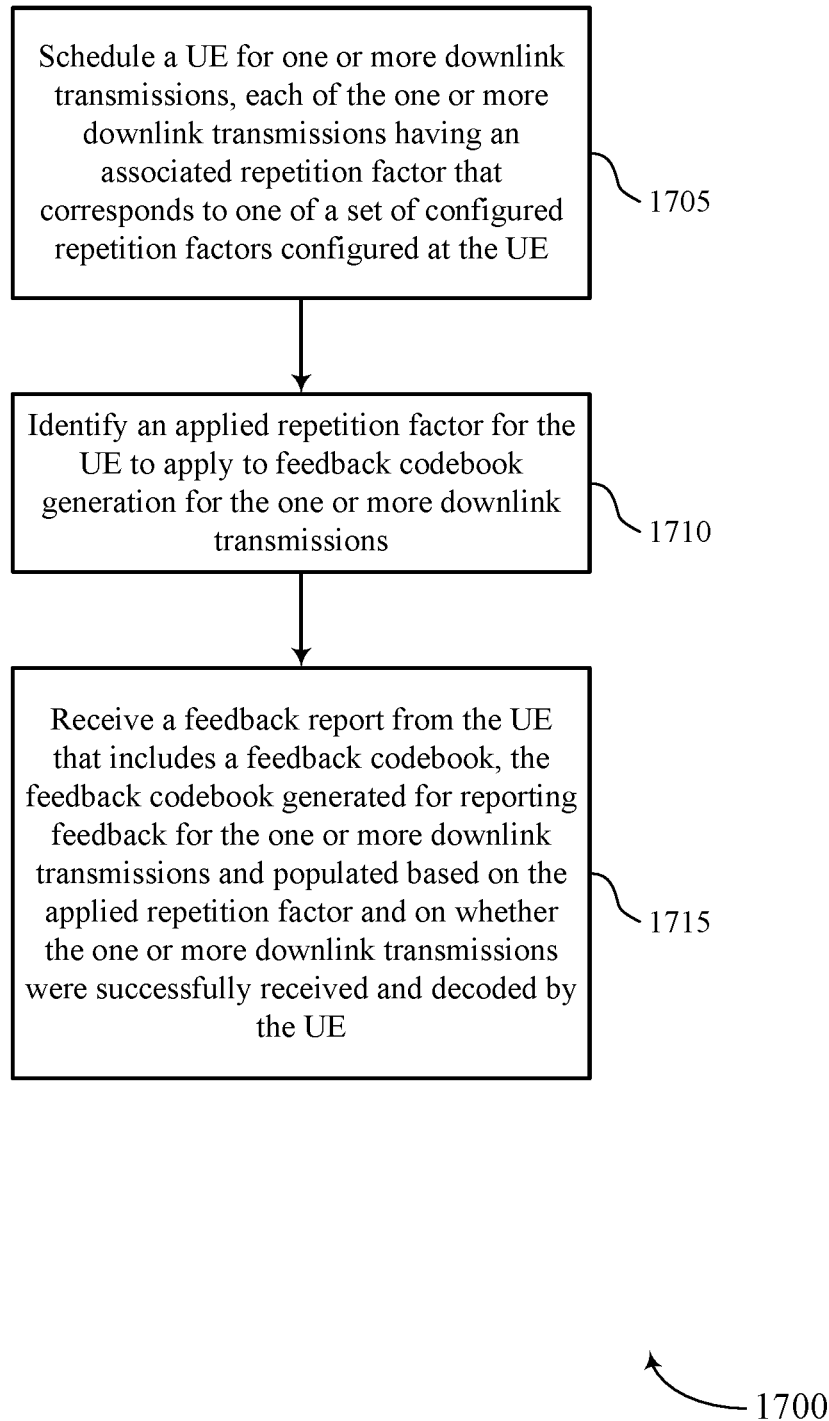

FIG. 17 shows a flowchart illustrating a method 1700 that supports type-1 codebook construction with multiple aggregation factors in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may schedule a UE for one or more downlink transmissions, each of the one or more downlink transmissions having an associated repetition factor that corresponds to one of a set of configured repetition factors configured at the UE. The operations of 1705 may be performed according to the methods described herein. In some examples, aspects of the operations of 1705 may be performed by a scheduling manager as described with reference to FIGS. 10 through 13.

At 1710, the base station may identify an applied repetition factor for the UE to apply to feedback codebook generation for the one or more downlink transmissions. The operations of 1710 may be performed according to the methods described herein. In some examples, aspects of the operations of 1710 may be performed by an applied repetition factor manager as described with reference to FIGS. 10 through 13.

At 1715, the base station may receive a feedback report from the UE that includes a feedback codebook, the feedback codebook generated for reporting feedback for the one or more downlink transmissions and populated based on the applied repetition factor and on whether the one or more downlink transmissions were successfully received and decoded by the UE. The operations of 1715 may be performed according to the methods described herein. In some examples, aspects of the operations of 1715 may be performed by a feedback report manager as described with reference to FIGS. 10 through 13.

Figure 18:
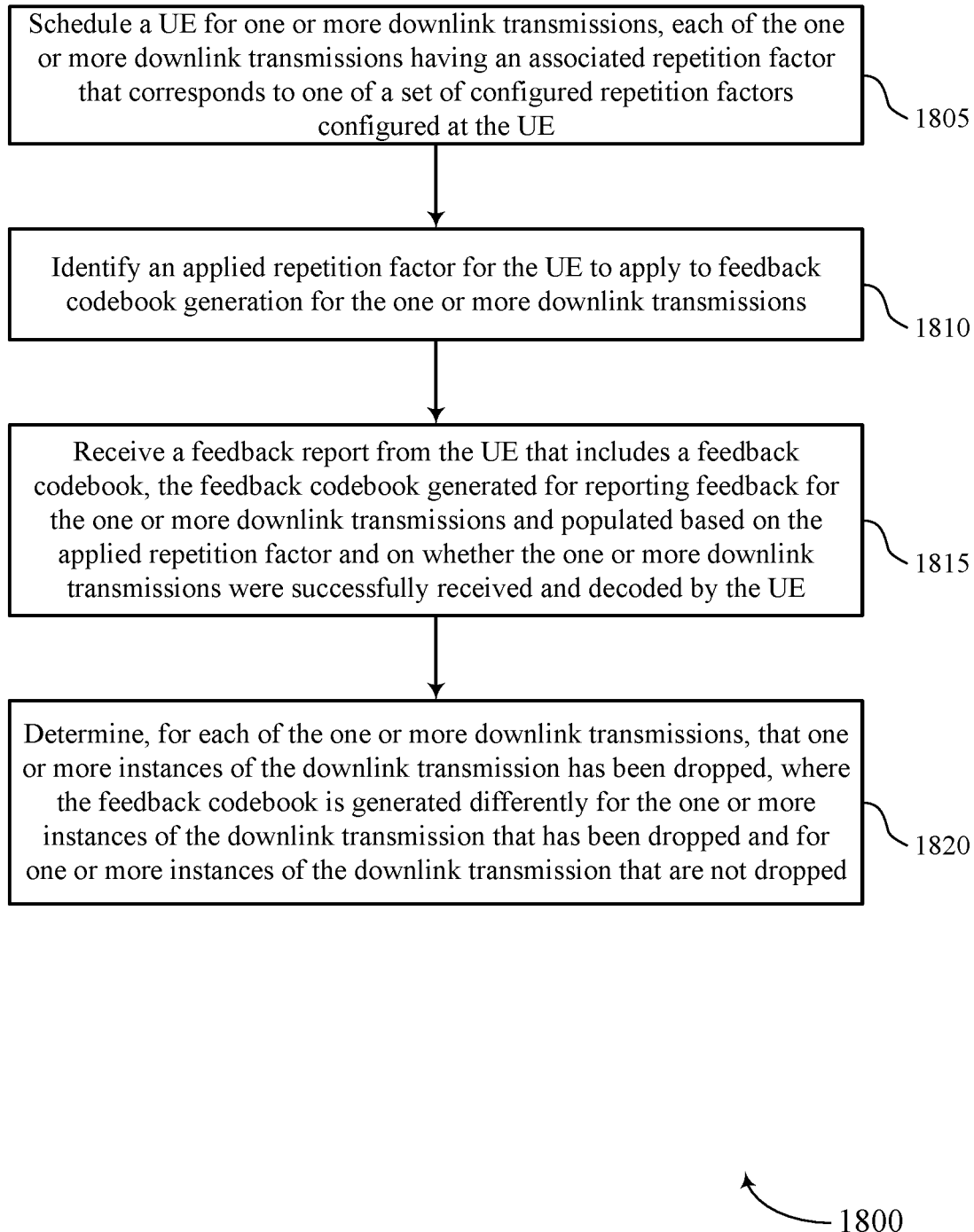

FIG. 18 shows a flowchart illustrating a method 1800 that supports type-1 codebook construction with multiple aggregation factors in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may schedule a UE for one or more downlink transmissions, each of the one or more downlink transmissions having an associated repetition factor that corresponds to one of a set of configured repetition factors configured at the UE. The operations of 1805 may be performed according to the methods described herein. In some examples, aspects of the operations of 1805 may be performed by a scheduling manager as described with reference to FIGS. 10 through 13.

At 1810, the base station may identify an applied repetition factor for the UE to apply to feedback codebook generation for the one or more downlink transmissions. The operations of 1810 may be performed according to the methods described herein. In some examples, aspects of the operations of 1810 may be performed by an applied repetition factor manager as described with reference to FIGS. 10 through 13.

At 1815, the base station may receive a feedback report from the UE that includes a feedback codebook, the feedback codebook generated for reporting feedback for the one or more downlink transmissions and populated based on the applied repetition factor and on whether the one or more downlink transmissions were successfully received and decoded by the UE. The operations of 1815 may be performed according to the methods described herein. In some examples, aspects of the operations of 1815 may be performed by a feedback report manager as described with reference to FIGS. 10 through 13.

At 1820, the base station may determine, for each of the one or more downlink transmissions, that one or more instances of the downlink transmission has been dropped, where the feedback codebook is generated differently for the one or more instances of the downlink transmission that has been dropped and for one or more instances of the downlink transmission that are not dropped. The operations of 1820 may be performed according to the methods described herein. In some examples, aspects of the operations of 1820 may be performed by a dropped transmission manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communication at a UE, comprising: determining that a base station has scheduled the UE for one or more downlink transmissions, each of the one or more downlink transmissions having an associated repetition factor that corresponds to one of a plurality of configured repetition factors configured at the UE; identifying an applied repetition factor to apply to feedback codebook generation for the one or more downlink transmissions; generating a feedback codebook for reporting feedback for the one or more downlink transmissions, the feedback codebook populated based at least in part on the applied repetition factor and on whether the one or more downlink transmissions were successfully received and decoded; and transmitting to the base station a feedback report that includes the feedback codebook.

Aspect 2: The method of aspect 1, further comprising: identifying the applied repetition factor based at least in part on a maximum number of configured repetition factors from the plurality of configured repetition factors.

Aspect 3: The method of aspect 2, further comprising: identifying the maximum number of configured repetition factors without counting configured repetition factors corresponding to inactive SPS configurations.

Aspect 4: The method of any of aspects 2 through 3, further comprising: identifying the maximum number of configured repetition factors by counting configured repetition factors corresponding to both active and inactive SPS configurations.

Aspect 5: The method of any of aspects 1 through 4, further comprising: identifying the applied repetition factor as one; and generating the feedback codebook based at least in part on a last instance of each downlink transmission that was actually received and decoded.

Aspect 6: The method of any of aspects 1 through 5, further comprising: determining, for each of the one or more downlink transmissions, that one or more instances of the downlink transmission has been dropped; and generating the feedback codebook differently for the one or more instances of the downlink transmission that has been dropped and for one or more instances of the downlink transmission that are not dropped.

Aspect 7: The method of aspect 6, wherein generating the feedback codebook further comprises: generating an ACK/NACK indication for each downlink transmission that was actually received and decoded; and refraining from generating an ACK/NACK indication for each instance of a dropped downlink transmission opportunity.

Aspect 8: The method of any of aspects 1 through 7, further comprising: receiving a configuration of a plurality of SPS configurations, wherein each downlink transmission of the one or more downlink transmissions is associated with a common SPS configuration or with different SPS configurations of the plurality of SPS configurations.

Aspect 9: The method of any of aspects 1 through 8, wherein the feedback codebook is generated without respect to a DCI associated with the one or more downlink transmissions.

Aspect 10: The method of any of aspects 1 through 9, wherein the UE is configured with a plurality of reporting offset values for transmitting the feedback report to the base station, each of the plurality of reporting offset values representing a number of slots after a last nominal downlink transmission, the plurality of reporting offset values spanning an evaluation window, the method further comprising: generating the feedback codebook based at least in part on evaluating each of the plurality of reporting offset values within the evaluation window.

Aspect 11: The method of any of aspects 1 through 10, wherein the feedback codebook comprises a type-1 codebook.

Aspect 12: A method for wireless communication at a base station, comprising: scheduling a UE for one or more downlink transmissions, each of the one or more downlink transmissions having an associated repetition factor that corresponds to one of a plurality of configured repetition factors configured at the UE; identifying an applied repetition factor for the UE to apply to feedback codebook generation for the one or more downlink transmissions; and receiving a feedback report from the UE that includes a feedback codebook, the feedback codebook generated for reporting feedback for the one or more downlink transmissions and populated based at least in part on the applied repetition factor and on whether the one or more downlink transmissions were successfully received and decoded by the UE.

Aspect 13: The method of aspect 12, further comprising: identifying the applied repetition factor based at least in part on a maximum number of configured repetition factors from the plurality of configured repetition factors.

Aspect 14: The method of aspect 13, further comprising: identifying the maximum number of configured repetition factors without counting configured repetition factors corresponding to inactive SPS configurations of the UE.

Aspect 15: The method of any of aspects 13 through 14, further comprising: identifying the maximum number of configured repetition factors by counting configured repetition factors corresponding to both active and inactive SPS configurations of the UE.

Aspect 16: The method of any of aspects 12 through 15, further comprising: identifying the applied repetition factor as one, wherein the feedback codebook is generated based at least in part on a last instance of each downlink transmission that was actually received and decoded.

Aspect 17: The method of aspect 16, further comprising: scheduling, based at least in part on the plurality of configured repetition factors, at least one non-conflicted instance of the downlink transmission during an evaluation window that is based at least in part on a reporting offset value.

Aspect 18: The method of any of aspects 12 through 17, further comprising: determining, for each of the one or more downlink transmissions, that one or more instances of the downlink transmission has been dropped, wherein the feedback codebook is generated differently for the one or more instances of the downlink transmission that has been dropped and for one or more instances of the downlink transmission that are not dropped.

Aspect 19: The method of aspect 18, wherein the feedback codebook is generated based at least in part on, an ACK/NACK indication is generated for each downlink transmission that was actually received and decoded by the UE, and an ACK/NACK indication is not generated for each instance of a dropped downlink transmission opportunity.

Aspect 20: The method of any of aspects 12 through 19, further comprising: transmitting a configuration of a plurality of SPS configurations, wherein each downlink transmission of the one or more downlink transmissions is associated with a common SPS configuration or with different SPS configurations of the plurality of SPS configurations.

Aspect 21: The method of any of aspects 12 through 20, wherein the feedback codebook is generated without respect to a DCI associated with the one or more downlink transmissions.

Aspect 22: The method of any of aspects 12 through 21, wherein the UE is configured with a plurality of reporting offset values for transmitting the feedback report to the base station, each of the plurality of reporting offset values representing a number of slots after a last nominal downlink transmission, the plurality of reporting offset values spanning an evaluation window, and the feedback codebook is generated based at least in part on the UE evaluating each of the plurality of reporting offset values within the evaluation window.

Aspect 23: The method of any of aspects 12 through 22, wherein the feedback codebook comprises a type-1 codebook.

Aspect 24: An apparatus for wireless communication at a UE, comprising a processor; memory coupled with the processor; and instructions stored in the memory and executable by the processor to cause the apparatus to perform a method of any of aspects 1 through 11.

Aspect 25: An apparatus for wireless communication at a UE, comprising at least one means for performing a method of any of aspects 1 through 11.

Aspect 26: A non-transitory computer-readable medium storing code for wireless communication at a UE, the code comprising instructions executable by a processor to perform a method of any of aspects 1 through 11.

Aspect 27: An apparatus for wireless communication at a base station, comprising a processor; memory coupled with the processor; and instructions stored in the memory and executable by the processor to cause the apparatus to perform a method of any of aspects 12 through 23.

Aspect 28: An apparatus for wireless communication at a base station, comprising at least one means for performing a method of any of aspects 12 through 23.

Aspect 29: A non-transitory computer-readable medium storing code for wireless communication at a base station, the code comprising instructions executable by a processor to perform a method of any of aspects 12 through 23.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communication systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   determining that a network device has scheduled the UE for one or more downlink transmissions, each of the one or more downlink transmissions having an associated repetition factor that corresponds to one of a plurality of configured repetition factors configured at the UE;
   identifying an applied repetition factor to apply to feedback codebook generation for the one or more downlink transmissions based at least in part on a maximum number of configured repetition factors of the plurality of configured repetition factors;
   generating a feedback codebook for reporting feedback for the one or more downlink transmissions, the feedback codebook populated based at least in part on the applied repetition factor; and
   transmitting to the network device a feedback report that includes the feedback codebook.

2. The method of claim 1, further comprising:
   identifying the maximum number of configured repetition factors without counting configured repetition factors corresponding to inactive semi-persistent scheduling (SPS) configurations.

3. The method of claim 1, further comprising:
   identifying the maximum number of configured repetition factors by counting configured repetition factors corresponding to both active and inactive semi-persistent scheduling (SPS) configurations.

4. The method of claim 1, further comprising:
   identifying the applied repetition factor as a value of one; and
   generating the feedback codebook.

5. The method of claim 1, further comprising:
   determining, for each of the one or more downlink transmissions, that one or more instances of the downlink transmission has been dropped; and
   generating the feedback codebook differently for the one or more instances of the downlink transmission that has been dropped and for one or more instances of the downlink transmission that are not dropped.

6. The method of claim 5, wherein generating the feedback codebook further comprises:
   generating an acknowledgement/negative-acknowledgement (ACK/NACK) indication for each downlink transmission that was actually received and decoded; and
   refraining from generating an ACK/NACK indication for each instance of a dropped downlink transmission opportunity.

7. The method of claim 1, further comprising:
   receiving a configuration of a plurality of semi-persistent scheduling (SPS) configurations, wherein each downlink transmission of the one or more downlink transmissions is associated with a common SPS configuration or with different SPS configurations of the plurality of SPS configurations.

8. The method of claim 1, wherein the feedback codebook is generated without respect to a downlink control information associated with the one or more downlink transmissions.

9. The method of claim 1, wherein the UE is configured with a plurality of reporting offset values for transmitting the feedback report to the network device, each of the plurality of reporting offset values representing a number of slots after a last nominal downlink transmission, the plurality of reporting offset values spanning an evaluation window, the method further comprising:
   generating the feedback codebook based at least in part on evaluating each of the plurality of reporting offset values within the evaluation window.

10. The method of claim 1, wherein the feedback codebook comprises a type-1 codebook.

11. A method for wireless communication at a network device, comprising:
    scheduling a user equipment (UE) for one or more downlink transmissions, each of the one or more downlink transmissions having an associated repetition factor that corresponds to one of a plurality of configured repetition factors configured at the UE;
    identifying an applied repetition factor for the UE to apply to feedback codebook generation for the one or more downlink transmissions based at least in part on a maximum number of configured repetition factors from the plurality of configured repetition factors; and
    receiving a feedback report from the UE that includes a feedback codebook, the feedback codebook generated for reporting feedback for the one or more downlink transmissions and populated based at least in part on the applied repetition factor.

12. The method of claim 11, further comprising:
identifying the maximum number of configured repetition factors without counting configured repetition factors corresponding to inactive semi-persistent scheduling (SPS) configurations of the UE.

13. The method of claim 11, further comprising:
identifying the maximum number of configured repetition factors by counting configured repetition factors corresponding to both active and inactive semi-persistent scheduling (SPS) configurations of the UE.

14. The method of claim 11, further comprising:
identifying the applied repetition factor as a value of one.

15. The method of claim 14, further comprising:
scheduling, based at least in part on the plurality of configured repetition factors, at least one non-conflicted instance of the downlink transmission during an evaluation window that is based at least in part on a reporting offset value.

16. The method of claim 11, further comprising:
determining, for each of the one or more downlink transmissions, that one or more instances of the downlink transmission has been dropped, wherein the feedback codebook is generated differently for the one or more instances of the downlink transmission that has been dropped and for one or more instances of the downlink transmission that are not dropped.

17. The method of claim 16, wherein the feedback codebook is generated based at least in part on, an acknowledgement/negative-acknowledgement (ACK/NACK) indication is generated for each downlink transmission that was actually received and decoded by the UE, and an ACK/NACK indication is not generated for each instance of a dropped downlink transmission opportunity.

18. An apparatus for wireless communication at a user equipment (UE), comprising:
a processor,
memory coupled with the processor; and
instructions stored in the memory and executable by the processor to cause the apparatus to:
determine that a network device has scheduled the UE for one or more downlink transmissions, each of the one or more downlink transmissions having an associated repetition factor that corresponds to one of a plurality of configured repetition factors configured at the UE;
identify an applied repetition factor to apply to feedback codebook generation for the one or more downlink transmissions based at least in part on a maximum number of configured repetition factors of the plurality of configured repetition factors;
generate a feedback codebook for reporting feedback for the one or more downlink transmissions, the feedback codebook populated based at least in part on the applied repetition factor; and
transmit to the network device a feedback report that includes the feedback codebook.

19. The apparatus of claim 18, wherein the instructions are further executable by the processor to cause the apparatus to:
identify the applied repetition factor as a value of one; and
generate the feedback codebook.

20. The apparatus of claim 18, wherein the instructions are further executable by the processor to cause the apparatus to:
determine, for each of the one or more downlink transmissions, that one or more instances of the downlink transmission has been dropped; and
generate the feedback codebook differently for the one or more instances of the downlink transmission that has been dropped and for one or more instances of the downlink transmission that are not dropped.

21. The apparatus of claim 20, wherein the instructions to generate the feedback codebook further are executable by the processor to cause the apparatus to:
generate an acknowledgement/negative-acknowledgement (ACK/NACK) indication for each downlink transmission that was actually received and decoded; and
refrain from generating an ACK/NACK indication for each instance of a dropped downlink transmission opportunity.

22. The apparatus of claim 18, wherein the instructions are further executable by the processor to cause the apparatus to:
receive a configuration of a plurality of semi-persistent scheduling (SPS) configurations, wherein each downlink transmission of the one or more downlink transmissions is associated with a common SPS configuration or with different SPS configurations of the plurality of SPS configurations.

23. The apparatus of claim 18, wherein the feedback codebook is generated without respect to a downlink control information associated with the one or more downlink transmissions.

24. The apparatus of claim 18, wherein the UE is configured with a plurality of reporting offset values for transmitting the feedback report to the network device, each of the plurality of reporting offset values representing a number of slots after a last nominal downlink transmission, the plurality of reporting offset values spanning an evaluation window.

25. The apparatus of claim 18, wherein the feedback codebook comprises a type-1 codebook.

26. The apparatus of claim 18, wherein the instructions are further executable by the processor to cause the apparatus to:
identify the applied repetition factor as a value of one.

27. The apparatus of claim 18, wherein the instructions are further executable by the processor to cause the apparatus to:
identify the applied repetition factor as a value of one.

28. An apparatus for wireless communication at a network device, comprising:
a processor,
memory coupled with the processor; and
instructions stored in the memory and executable by the processor to cause the apparatus to:
schedule a user equipment (UE) for one or more downlink transmissions, each of the one or more downlink transmissions having an associated repetition factor that corresponds to one of a plurality of configured repetition factors configured at the UE;
identify an applied repetition factor for the UE to apply to feedback codebook generation for the one or more downlink transmissions based at least in part on a maximum number of configured repetition factors of the plurality of configured repetition factors; and
receive a feedback report from the UE that includes a feedback codebook, the feedback codebook generated for reporting feedback for the one or more downlink transmissions and populated based at least in part on the applied repetition factor.

* * * * *